(12) United States Patent
Sato et al.

(10) Patent No.: US 7,580,612 B2
(45) Date of Patent: Aug. 25, 2009

(54) DIGITAL BROADCAST SENDING APPARATUS, RECEIVING APPARATUS AND DIGITAL BROADCAST SYSTEM

(75) Inventors: Yoshihito Sato, Hitachi (JP); Osamu Tomobe, Mito (JP); Takaharu Ishida, Hitachinaka (JP); Hiroki Uchiyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 644 days.

(21) Appl. No.: 11/249,347

(22) Filed: Oct. 14, 2005

(65) Prior Publication Data

US 2006/0083315 A1 Apr. 20, 2006

(30) Foreign Application Priority Data

Oct. 15, 2004 (JP) .............................. 2004-301068

(51) Int. Cl.
H04N 5/94 (2006.01)
H04N 5/91 (2006.01)
H04N 7/00 (2006.01)
(52) U.S. Cl. .............................. 386/47; 386/48; 386/50; 386/51; 386/83; 386/95; 386/123
(58) Field of Classification Search ................... 386/95, 386/109, 111, 114, 123, 129, 131, 47, 48, 386/50, 51, 83
See application file for complete search history.

(56) References Cited

U.S. PATENT DOCUMENTS

| | | | | | |
|---|---|---|---|---|---|
| 5,585,843 | A | * | 12/1996 | Ishizuka et al. | 348/208.13 |
| 6,393,152 | B2 | * | 5/2002 | Takahashi et al. | 382/233 |
| 7,256,815 | B2 | * | 8/2007 | Suzuki et al. | 347/249 |
| 7,286,601 | B2 | * | 10/2007 | Kitamura | 375/259 |

FOREIGN PATENT DOCUMENTS

| | | | |
|---|---|---|---|
| EP | 1039394 A2 | * | 9/2000 |
| JP | 2003-143503 A | | 5/2003 |
| JP | 2005-277873 A | | 10/2005 |

* cited by examiner

*Primary Examiner*—Thai Tran
*Assistant Examiner*—Hung Q Dang
(74) *Attorney, Agent, or Firm*—Crowell & Moring LLP

(57) ABSTRACT

In the digital broadcast to a mobile unit, the continuous reproduction of an image cannot be guaranteed when switching the hierarchical level in accordance with the receiving condition of the radio wave and therefore the viewer has a sense of discomfort. A digital broadcast sending apparatus sends out by encoding a plurality of simultaneous broadcast streams in the same sync signal generator. A switching determination unit of the receiving apparatus switches the plurality of simultaneous broadcast streams in accordance with the receiving condition (weak hierarchical level/strong hierarchical level), and a sync adjustment unit continuously displays an image without interruptions based on the received sync signal. At the time of this switching operation, one stream is gradually switched to the other.

18 Claims, 18 Drawing Sheets

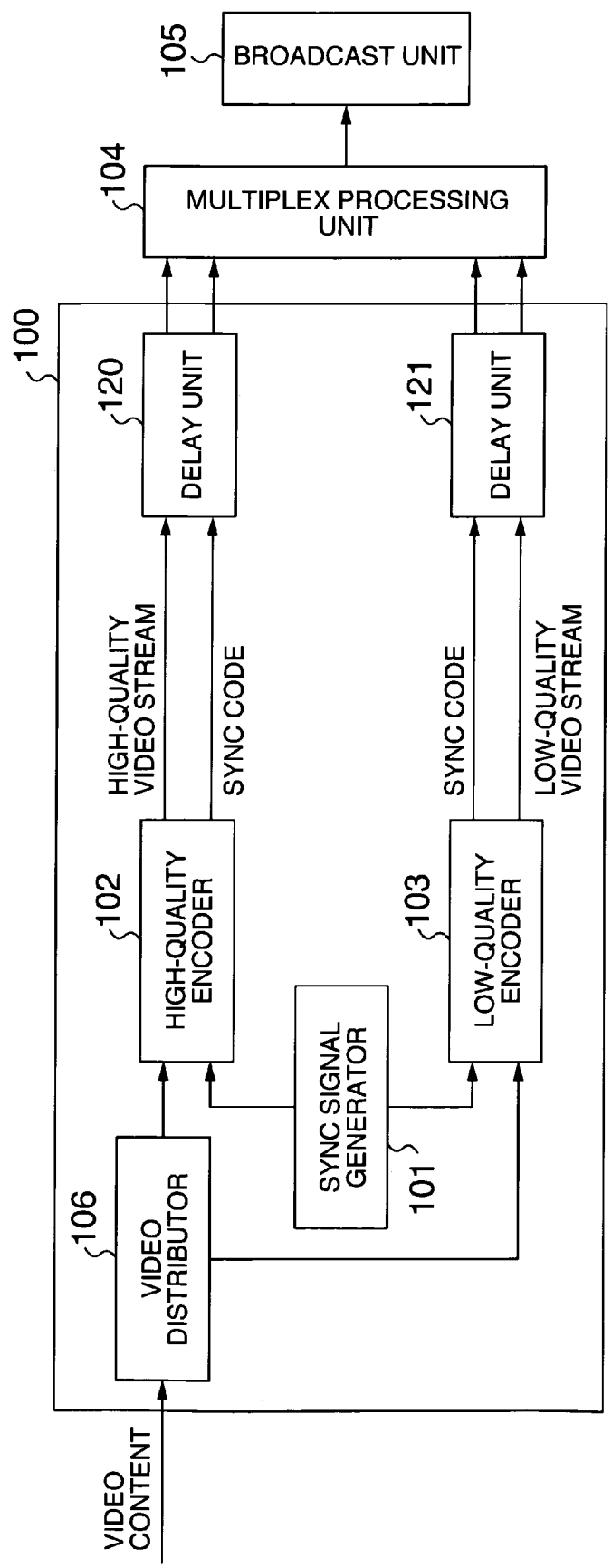

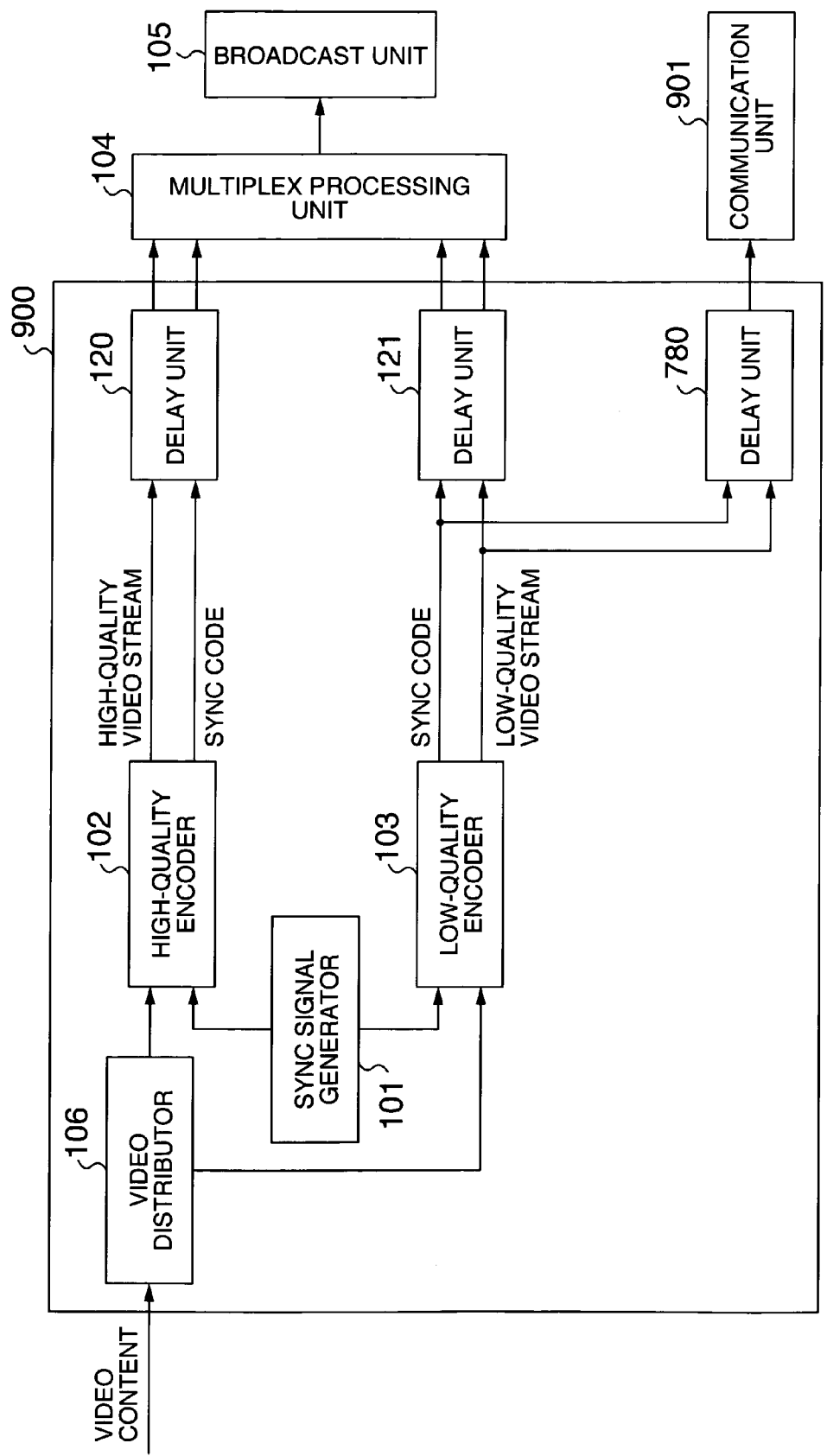

DIGITAL BROADCAST SENDING APPARATUS, RECEIVING APPARATUS AND DIGITAL BROADCAST SYSTEM

CROSS REFERENCE TO RELATED APPLICATIONS

This application relates to the co-pending U.S. Applications entitled "Digital broadcast receiving apparatus", application Ser. Nos. 10/321,351 and 10/390,666 filed on Dec. 18, 2002

BACKGROUND OF THE INVENTION

This invention relates to a digital broadcast system, or in particular to a sending apparatus and a receiving apparatus thereof.

In recent years, the digitization of the television broadcast has advanced. The CS, BS and the terrestrial digital broadcasts have already started for fixed receivers. In the future, the digital broadcast service for mobile units is expected to be started.

In receiving the broadcast by mobile units, as compared with the fixed receivers, the receiving conditions undergo great variations due to such factors as the shadowing, fading, and Doppler shift of the frequency of the radio wave occurring during the movement. An attempt by mobile units to receive images and voices of a quality as high as the broadcast to fixed receivers, therefore, may fail while passing through an environment of a deteriorated field strength. In the receiving operation by mobile units, therefore, it is important to prevent the broadcast service from being interrupted by taking measures against the variations of the radio wave receiving conditions during the movement.

In the digital broadcast, the video information are digitized and sent out in a bit stream. Further, this bit stream is multiplexed with those of other information (the voice, channel information and program information, for example), and after RF modulation, broadcast as a broadcast wave from an antenna. These bit streams are hereinafter referred to simply as streams. Also, if necessary, an image converted to a bit stream is referred to as a video stream, and the voice converted to a bit stream as an audio stream.

The digital broadcast includes a scheme called the hierarchical transmission. In the hierarchical transmission, the band in the broadcast radio channel is divided, and for each band thus divided, a different transmission scheme is used. In the band called a weak hierarchical level, which is narrow in dynamic range that can be secured and not adapted for the receiving operation of a mobile unit, a high-quality image can be transmitted at a high bit rate using a broad band. In the band called a strong hierarchical level, on the other hand, though the image is low in quality with a low bit rate, the transmission is possible by a transmission scheme suitable for mobile receivers.

With the screen size of about 2 or 3 inches of a portable terminal, the viewers are not embarrassed, due to the small screen size, by an image of a quality that can be transmitted at the weak hierarchical level. With the screen not smaller than 7 inches in size mounted on an on-vehicle terminal, however, the viewers desire the image of a quality of at least analog SD (standard) TV or a higher-quality HD (high definition) TV.

The conventional broadcast system (called the simultaneous broadcast) is known in which at the transmitting end, as disclosed in JP-A-2003-143503, a high-quality and low-quality video streams are generated from the same content and sent out at the weak and strong hierarchical levels, respectively. At the receiving end, on the other hand, the high-quality video stream of weak hierarchical level is displayed when the radio wave receiving condition is good condition, while the mode is switched to the low-quality video stream of strong hierarchical level when the radio wave receiving condition is deteriorated. In this way, a high-quality image is displayed in manner not to freeze the image against the variations of the radio wave condition.

SUMMARY OF THE INVENTION

In the prior art, however, a continuous image display completely free of interruptions is not guaranteed when the streams are switched. Specifically, the processing time required for coding the video stream at strong hierarchical level is different from the processing time required for coding the video stream at weak hierarchical level, and fluctuations occur. The video content, even if input at the same time, are shifted between the two types of streams by several milliseconds to several seconds or more when output. More shifts may occur in applications to a transmission path other than the broadcast. In the case where multiplexed streams are broadcast and received by a receiving apparatus, therefore, it is highly possible that a shift has occurred between the streams. When switching the streams having this time shift, an image advance, image return or such a gap as a sound skip is caused at the moment of switching.

Especially, while the mobile unit is moving, the field strength is liable to be subjected to a sharp change within a short time, and in the case where the field strength is at about a threshold, the switching determination is varied more than frequently and the hierarchical level is switched so frequently that temporally shifted images are switched within a short time. Thus, the image continuity cannot be maintained, thereby causing a great sense of discomfort to viewers. JP-A-2003-143503 attempts to solve this problem by using a method in which once streams are switched, the original stream can be restored only after the lapse of a predetermined time. The video continuity, however, is not guaranteed at all.

In the switching operation, high-quality and low-quality images are switched between them. The image that can be received at weak hierarchical level has the SDTV or HDTV quality, and the number of pixels of the video format called 1080i of HDTV quality is 1440×1080. The image that can be received at strong hierarchical level to view on a small screen of a portable terminal, on the other hand, is QVGA having a small number of pixels (320×240) or QCIF having a smaller number of pixels (176×144). At the time of switching between these video formats, therefore, a great gap of the number of pixels occurs, thereby causing the great sense of discomfort to the viewers.

The on-vehicle receiver attracts the attention of the driver the instant of switching the screen lacking the continuity, and reduces the safety.

In view of the problem of the prior art described above, an object of this invention is to provide a digital broadcast system capable of displaying an image continuously switching without interruptions, and a sending apparatus and a receiving apparatus for the system. By this switching operation, the sense of discomfort to the viewers can be greatly decreased.

In order to achieve the aforementioned object, according to this invention, there is provided a digital broadcast receiving apparatus having a video display unit for displaying an image by receiving a broadcast signal with a high-quality first video code with a sync signal and a low-quality second video code with a sync signal generated from the same video content and multiplexed with each other, wherein it comprising a demultiplex processing unit for separating the data multiplexed on the broadcast signal, a first decoder for decoding the first video code and the sync signal thereof, a second decoder for decoding the second video code and the sync signal thereof, a first buffer for holding the decoded high-quality video signal image, a second buffer for holding the decoded low-quality video signal image, an enlargement processing unit for recovering and enlarging the low-quality video signal from the second buffer, a switching determination unit for monitoring the receiving condition of the high-quality video signal and determining whether the high-quality video signal receiving condition is good condition or not, and a sync adjustment unit for recovering the high-quality video signal from the first buffer in the case where the determination result of the switching determination unit is good condition while recovering the low-quality video signal enlarged by the enlargement processing unit in the case where the determination is negative, and in accordance with the delayed one of the sync signals, outputting the video signal to the video display unit.

With the aforementioned configuration, the digital broadcast receiving apparatus according to this invention can display the image continuously without interruptions based on the sync signals by switching a plurality of simultaneously broadcast streams in accordance with the receiving condition thereof.

Also, according to this invention, there is provided a digital broadcast sending apparatus for sending out the first high-quality video code and the low-quality second video code, each containing a sync signal, generated from the same video content and multiplexed, characterized by comprising a sync signal generator for generating a sync signal, a video distributor for distributing the video content, a first video encoder for encoding one of the distributed video content in synchronism with the sync signal thereby to generate a first video code and a sync signal in synchronism with the first video code, a second video encoder for encoding another one of the distributed video content with a quality different from the first video encoder thereby to generate a second video code and a sync code in synchronism with the second video code, a first delay unit for delaying the first video code and the first sync code, a second delay unit for delaying the second video code and the second sync code, and a multiplexer for multiplexing the first video code with the first sync signal and the second video code with the second sync code with a time shift not longer than a predetermined time.

With the configuration described above, the digital broadcast sending apparatus according to the invention is capable of encoding and sending out the two simultaneous broadcast streams with the same sync signal and thus can suppress the time shift between the two streams to not longer than a predetermined time.

Further, according to this invention, there is provided a digital broadcast system comprising a sending apparatus for multiplexing a high-quality first video code and a low-quality second video code, each containing a sync signal, generated from the same video content and sending out the multiplexed signal as a broadcast signal, and a receiving apparatus for receiving the broadcast signal and displaying an image, wherein the digital broadcast sending apparatus as the above-mentioned sending apparatus and the digital broadcast receiving apparatus as the above-mentioned receiving apparatus.

With the digital broadcast sending apparatus and receiving apparatus according to the invention, the image is continuously displayed without any interruption at the time of switching the streams.

With the digital broadcast sending apparatus and receiving apparatus according to the invention, the stream switching operation is not easily recognized by the viewers even in the case where the video resolution is changed while the streams are switched.

The other objects, features and advantages of the invention will be made apparent by the description of embodiments of the invention taken below in conjunction with the accompanying drawings.

BRIEF DESCRIPTION OF THE DRAWINGS

FIGS. 1A, 1B are diagrams showing a configuration of a digital broadcast system according to a first embodiment of the invention.

FIGS. 12A, 12B are diagrams showing a configuration of a digital broadcast system according to a sixth embodiment of the invention.

DETAILED DESCRIPTION OF THE EMBODIMENTS

A digital broadcast sending apparatus and receiving apparatus and a digital broadcast system using them according to embodiments of the invention are explained below with reference to the drawings.

First Embodiment

Figure 1B:
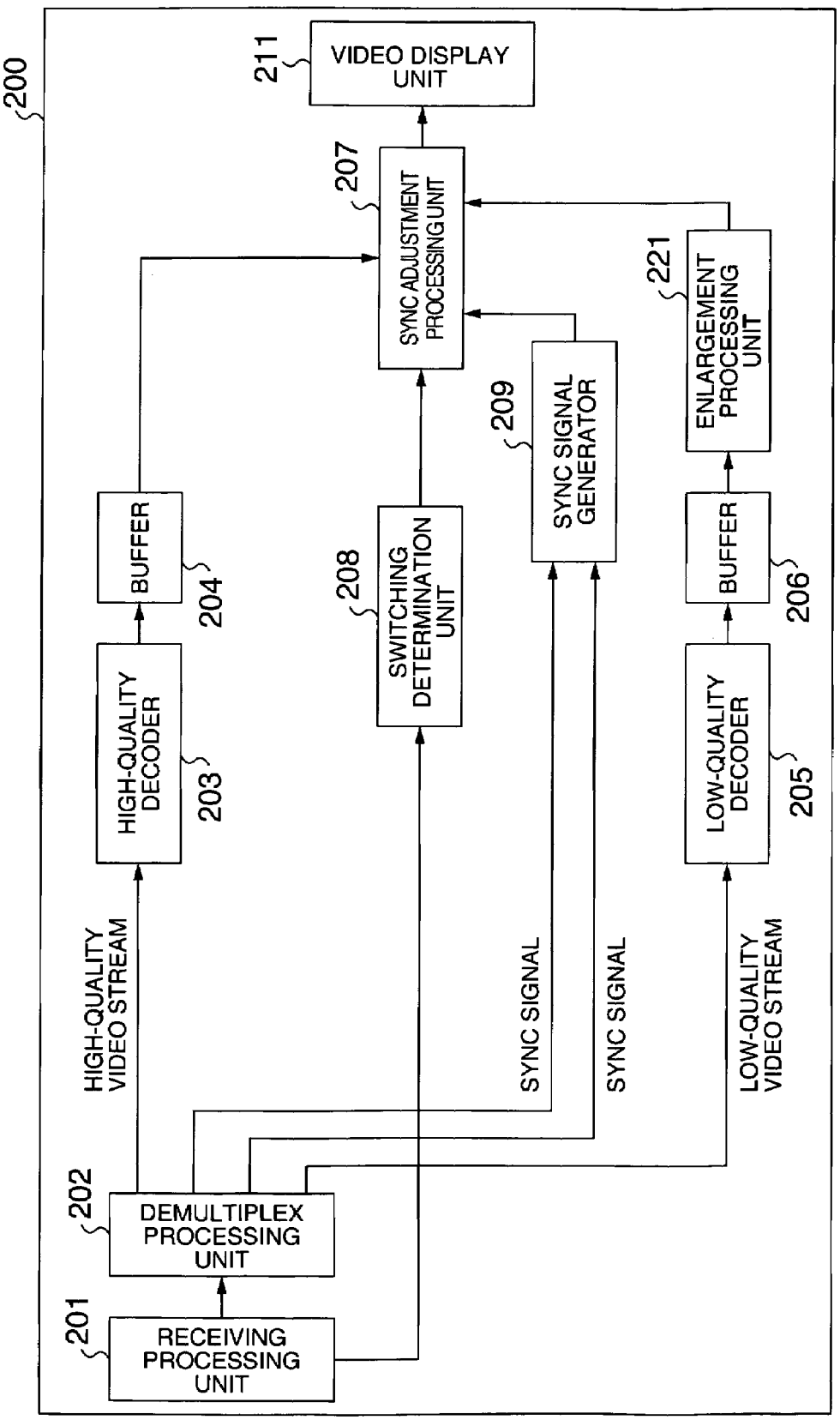

FIGS. 1A, 1B are block diagrams showing a configuration of a digital broadcast system according to an embodiment of the invention. FIG. 1A shows the configuration of a sending apparatus 100 and FIG. 1B that of a receiving apparatus 200.

The sending apparatus 100 is installed in a broadcast station to send out broadcast video streams. The sending apparatus 100 is configured of a sync signal generator 101, a video distributor 106, a high-quality encoder 102, a low-quality encoder 103, a delay unit 120 and a delay unit 121. The sending apparatus 100 is used as a broadcasting apparatus in combination with a multiplex processing unit 104 and a broadcasting unit 105.

The video distributor 106 receives and digitizes the input video content, distributes the digitized video content and supplies them to the high-quality encoder 102 and the low-quality encoder 103, respectively.

The sync signal generator 101 generates clock pulses at regular time intervals, and supplies a pulse count value to the encoders 102, 103. In the digital broadcasting, the clock pulses of 27 MHz are used as a standard.

The high-quality encoder 102 and the low-quality encoder 103 acquire the video content from the video distributor 106 and the count value from the sync signal generator 101.

The encoders are synchronized with each other based on the count value, start the encode operation on the video frame of the same count value and output the video code and the sync signal in the form of bit streams. The bit streams of the video code and the sync signal (hereinafter referred to as the sync code) each have a unique ID value and thus can be identified. In the video code, the frame rate and the time stamp are added to each data block. At the receiving end, the time stamp and the sync signal value are compared and in accordance with the frame rate, each frame is displayed thereby to secure the synchronism of images.

The video code and the sync code output are multiplexed by the multiplex processing unit 104, and modulated, changed in frequency and sent out as a radio signal by the broadcast unit 105.

In the process, the time required for the high-quality video encode operation and the low-quality video encode operation are generally different from each other, and this conversion time fluctuates. At the time point when the signal is sent out by the broadcast unit 105, therefore, the two types of signals have a time shift from each other. This shift ranges from several milliseconds to several hundred milliseconds or longer.

The sending apparatus 100 according to this embodiment includes a delay unit 120 in which the high-quality video code and the sync code output from the high-quality encoder 102 are temporarily held and after the lapse of a predetermined time, sent out to the multiplex processing unit 104. Further, the sending apparatus 100 includes a delay unit 121 in which the low-quality video code and the sync code output from the low-quality encoder 103 are temporarily held and after the lapse of a predetermined time, sent out to the multiplex processing unit 104. In this way, the time shift described above can be absorbed.

Figure 2:
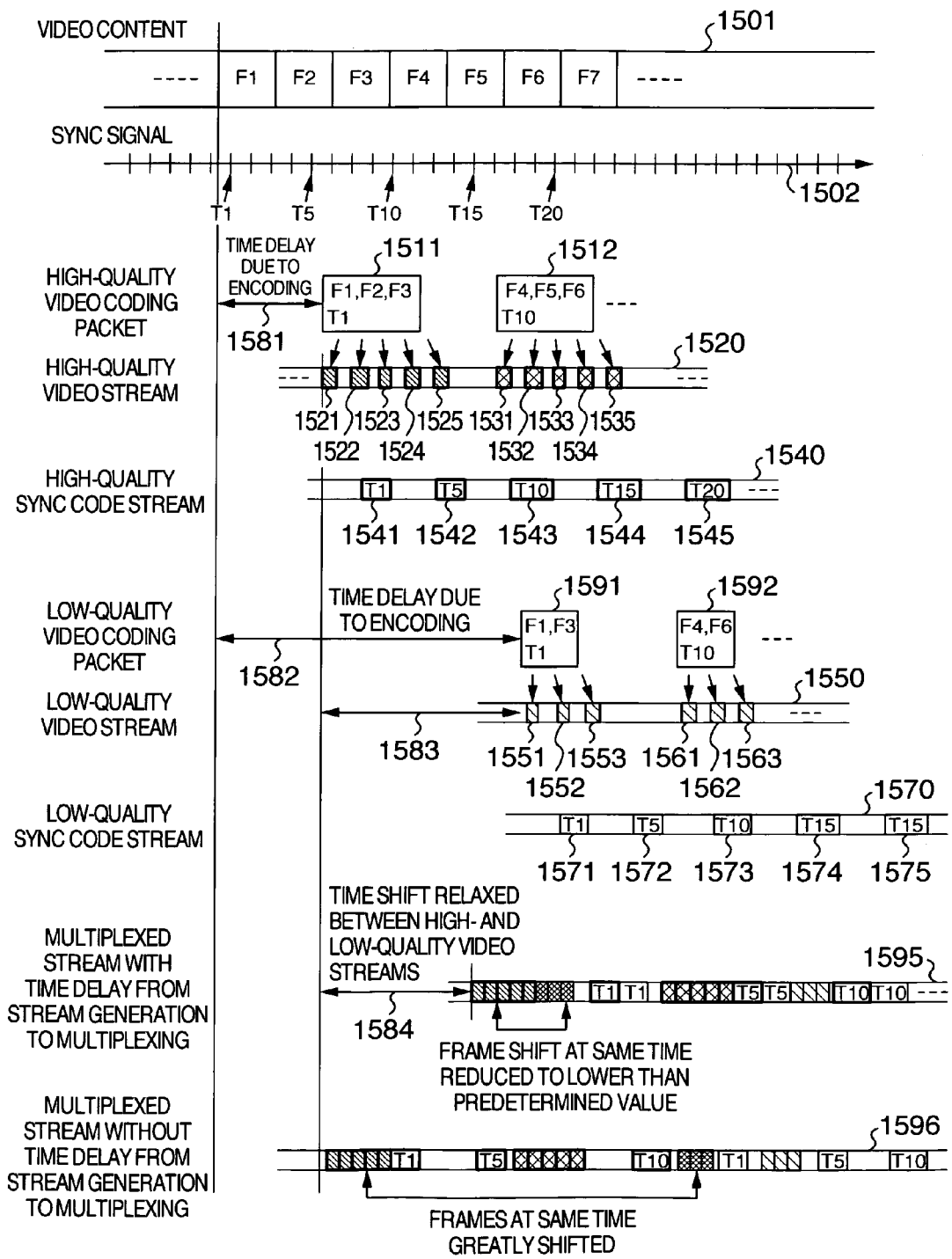
FIG. 2 is a schematic diagram showing the generation of streams after the multiplexing process according to the first embodiment.

FIG. 2 is a schematic diagram showing the manner in which streams are generated from the video content after the multiplex operation. The horizontal direction in the drawing shows the time advance from left to right. Numeral 1501 designates each frame of the original video content. Although only seven frames F1 to F7 are designated by numerals, similar frames exist also before and after them. Normally, the video content have the information amount of about 30 frames per second, the whole of which cannot be shown but only a part thereof in the drawing.

Numeral 1502 designates a sync signal. Pulses are generated at regular time intervals, and the count values are indicated typically by T1, T10, T20. T1 designates the count value of the sync signal corresponding to the frame F1 of the video content, T10 to the frame F4, and T20 to the frame F7.

Numerals 1511, 1512 designate the data encoded by the high-quality encoder 102. Numeral 1511 designates the frames F1, F2, F3 encoded into a single packet. Numeral 1512 designates the frames F4, F5, F6 encoded into a packet. In the packets 1511 and 1512, time stamps T1 and T10, respectively, are added as information. In the digital broadcasting, PES (packetized elementary stream) is generally used as this packet format.

Numeral 1581 designates the time delay from the actual input of the video content to the generation of the packet 1511. This time delay is about several seconds.

Numerals 1521 to 1525 show the manner in which the packet 1511 is further subdivided into packets. In the digital broadcasting, TSP (transport stream packet) is generally used as the subdivision packets. In similar fashion, numerals 1531 to 1535 designate the packet 1512 subdivided into packets. These packet trains make up a high-quality video stream 1520.

The high-quality video sync code stream 1540 including packets 1541 to 1545 contains the count value of the sync signal in the packets as a high-quality sync code. The sync code provides a reference for generating the sync signal in the receiver and therefore is required to be contained with a sufficiently small time shift of time intervals in the final multiplexed stream. Also, taking the buffering time in the receiver into consideration, the sync code is generally delayed at least a predetermined time behind the subdivision packets having the same count value as a time stamp.

The packets 1591 and 1592 include the data encoded by the low-quality encoder 103. The packet 1591 includes result of encoding the frames F1, F3 and the time stamp T1, and the packet 1592 the result of encoding the frames F4, F6 and the time stamp T10. The absence of the frames F2, F5 indicates a reduced frame rate as compared with the high-quality image. In the shown example, the frame rate is reduced to one half.

Numerals 1551 to 1553 and 1561 to 1563 designate the subdivision packets divided from the packets 1591 and 1592, respectively. Numeral 1550 shows a low-quality video stream configured of these subdivision packets.

Numerals 1571 to 1575 designate the packets of the sync code containing the count value of the sync signal as a low-quality sync code. Numeral 1570 designates a low-quality sync code stream.

Numeral 1582 designates the time delay from the actual input of the video content to the generation of the low-quality packet 1591. This time delay is about several seconds like the time delay 1581 of the high-quality packet 1511. Nevertheless, the time delays are not necessarily coincident with each other, and have respective fluctuations. In the case where the video content of the same time point are encoded, therefore, the high-quality video stream and the low-quality video stream generate a time shift as indicated by numeral 1583.

Numerals 1595, 1596 designate streams multiplexed from the high-quality video stream 1520, the high-quality sync code stream 1540, the low-quality video stream 1550 and the low-quality sync code stream 1570.

The stream 1596 is multiplexed without taking the time shift 1583 required to encode in the high-quality encoder and the low-quality encoder into consideration. In the stream 1596, the frames of the video content for the low-quality and high-quality signals are greatly shifted for the same time point. In the case where they are switched in the receiver, therefore, the continuous video reproduction requires a larger buffer. In the stream 1595, on the other hand, the time shift is absorbed, like the time shift 1584 in the stream after the multiplex operation, and the frames for the same time point are contained within a predetermined time. Thus, the buffer capacity at the receiving end is reduced.

As long as a sufficient buffer is available at the receiving end, the encode operation is performed based on a single sync signal. Thus, the same frames of the original video content have a time stamp based on the count value of the same sync signal, and therefore a continuous image can be displayed by displaying each frame based on one of the sync codes at the time of switching.

In the sending apparatus according to this embodiment, each encoder performs the encode operation for the frames of the same time point in accordance with the same clock. The frame rate of the high-quality image, therefore, is desirably an integer multiple of the frame rate of the low-quality image.

Also, in the case where MPEG2 is used as the encoding scheme for high-quality image and MPEG4 as the encoding scheme for low-quality image, the frame positions of the I pictures thereof are desirably coincident with each other.

Next, the digital broadcast receiving apparatus is explained. The receiving apparatus 200 shown in FIG. 1B includes a receiving processing unit 201 for modulating, receiving, demodulating and correcting the error of the radio broadcast signal and recovering the TS (transport stream) data.

The demultiplex processing unit 202 recovers the high-quality video code multiplexed on the received TS, the sync signal stream in synchronism with the high-quality video code, the low-quality video code and the sync signal stream in synchronism with the low-quality video code, which are distributed to the high-quality video decoder 203 and the low-quality video decoder 205, respectively.

In the high-quality decoder 203, the image frame to be displayed and the time stamp of the particular image frame are decoded from the high-quality video stream and output to the buffer 204. In the low-quality decoder 205, on the other hand, the image frame to be displayed and the time stamp of the particular image frame are decoded from the low-quality video stream and output to the buffer 206.

The switching determination unit 208 monitors the receiving condition of the data at the low hierarchical level and in the case where the data at the low hierarchical level turns unreceivable from receivable state, the information on the impossibility to receive at the weak hierarchical level is transmitted to the sync adjustment processing unit 207.

Also, the switching determination unit 208 monitors the receiving condition of the receiving processing unit, and determines whether the high-quality video code is in good receiving condition, and in the case where the receiving condition is poor condition, notifies the sync adjustment processing unit 207. Also in the case where the receiving condition is restored from "poor condition" to "good condition", the sync adjustment processing unit 207 is notified.

The switching determination unit 208 can monitor the receiving condition using the receiving power strength or the C/N ratio (Carrier to Noise power ratio) at the weak hierarchical level in the receiving processing unit 201 or BER (Bit Error Rate) at the weak hierarchical level in the receiving processing unit 201.

Alternatively, the switching determination unit 208 may make the determination using not the information of the receiving processing unit but the noise mixing rate at the time of restoring the image frame output to the buffer 204.

The sync signal generator 209 generates clock pulses at a unique period, and outputs the count value. Also, the sync signal generator 209, supplied with a sync signal, has the function to output a count value in synchronism with the count value contained in the sync signal.

The enlargement processing unit 221 recovers the low-quality image decoded by the low-quality decoder held in the buffer 206, executes the enlarging process to the same size as the high-quality image and supplies the resulting image to the sync adjustment processing unit 207. The enlargement processing unit 221, in response to the request of the sync adjustment processing unit 207, recovers and enlarges the low-quality image from the buffer 206, and delivers it to the sync adjustment processing unit 207. As an alternative, the low-quality image decoded by the low-quality decoder 205 may be enlarged by the enlargement processing unit 221, and held by the buffer 206.

In the sync adjustment processing unit 207, the video display process is executed in accordance with the sync signal contained at the strong hierarchical level or the sync signal contained at the weak hierarchical level, whichever is delayed in count value, and the image is displayed on the video display unit 211. In the process, a count value is obtained which is in synchronism with the last-arriving one of the sync signals produced from the sync signal generator 209, and a video frame to be presented by this count value is selected from the buffer 204 and presented.

The video frame can be selected by the time stamp and the frame rate assigned to the video frame. Specifically, the old frames held in the buffer 204 are searched, and based on the time stamp and the frame rate attached to the frame, the count value at which the particular frame is to be presented is determined. The video frames with this value older than the prevailing count value are discarded. As a result, the frame nearest to the prevailing count value can be acquired.

In similar fashion, the sync adjustment processing unit 207 executes the process of acquiring the nearest frame to the prevailing count value for the video frames contained in the buffer 206 and discarding the previous frames.

In initial state, the image contained at the weak hierarchical level held in the buffer 204 which is acquired as described above is displayed. Further, upon receipt of the notification from the switching determination unit 208 that the data at the weak hierarchical level has become impossible to receive, the sync adjustment processing unit 207 displays the video frame acquired from the buffer 206 while at the same time discarding the video frame acquired from the buffer 204.

The process described above makes it possible to switch the two video frames in synchronism with the same sync signal, so that even in the case where two images arriving at different timings are switched, the image can be displayed continuously by the switching operation.

Figure 3:
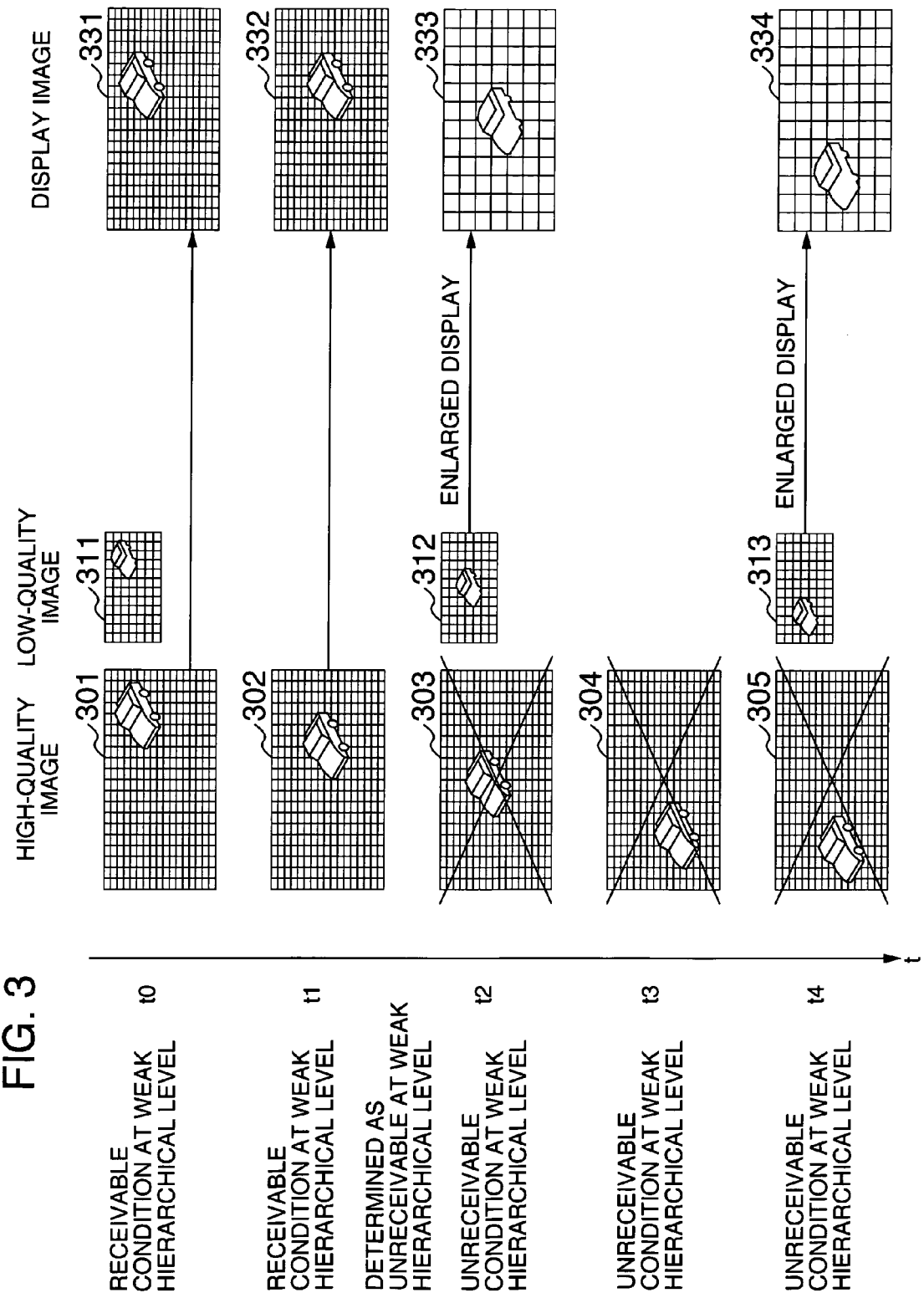
FIG. 3 is a diagram for explaining the video switching from weak to strong hierarchical level according to the first embodiment.

FIG. 3 is a diagram for explaining the manner in which the image is changed from weak to strong hierarchical level. Time advances top down from t0, t1, t2, t3, t4 in that order. Numerals 301 to 305 indicate the frames at each time point when the high-quality image transmitted at the weak hierarchical level is decoded. Numerals 311 to 313 indicate the frames at each time point when the low-quality image transmitted at the strong hierarchical level is decoded. The number of pixels and the frame rate are different between the high-quality image and the low-quality image.

In FIG. 3, an explanation is made on the assumption that the receive operation at strong hierarchical level is determined as impossible at time point t2.

At time points t0, t1, the sync adjustment processing unit 206 acquires the high-quality images 301, 302 from the buffer 204 and outputs them as display images, while the low-quality image 311 is recovered from the buffer 206 and discarded.

Upon receipt, at time point t2, of the determination from the switching determination unit 208 that the receiving at weak hierarchical level is impossible, the high-quality images 303 to 305 at weak hierarchical level at time point t2 are discarded, while the low-quality images 312, 313 at strong hierarchical level are enlarged and displayed as display images 333, 334 at time points t2, t4, respectively. In this case, the frame rate of the low-quality image is reduced below that for the high-quality image at time point t3, and therefore no image exists at the particular time point. At time point t3, therefore, the display image is not updated and the same image as the display image 333 for time point t2 is displayed.

According to this embodiment, a plurality of broadcast streams generated from the same video content (such as the simultaneous broadcast) are switched in accordance with the receiving condition of the high-quality images, and based on the sync signal, the image can be continuously displayed without interruptions.

Second Embodiment

In the first embodiment, the image is switched from high-quality image to low-quality image or from low-quality image to high-quality image by the time equivalent to one frame. According to the second embodiment, an example of reducing the gap generated at the time of switching is explained.

Figure 4:
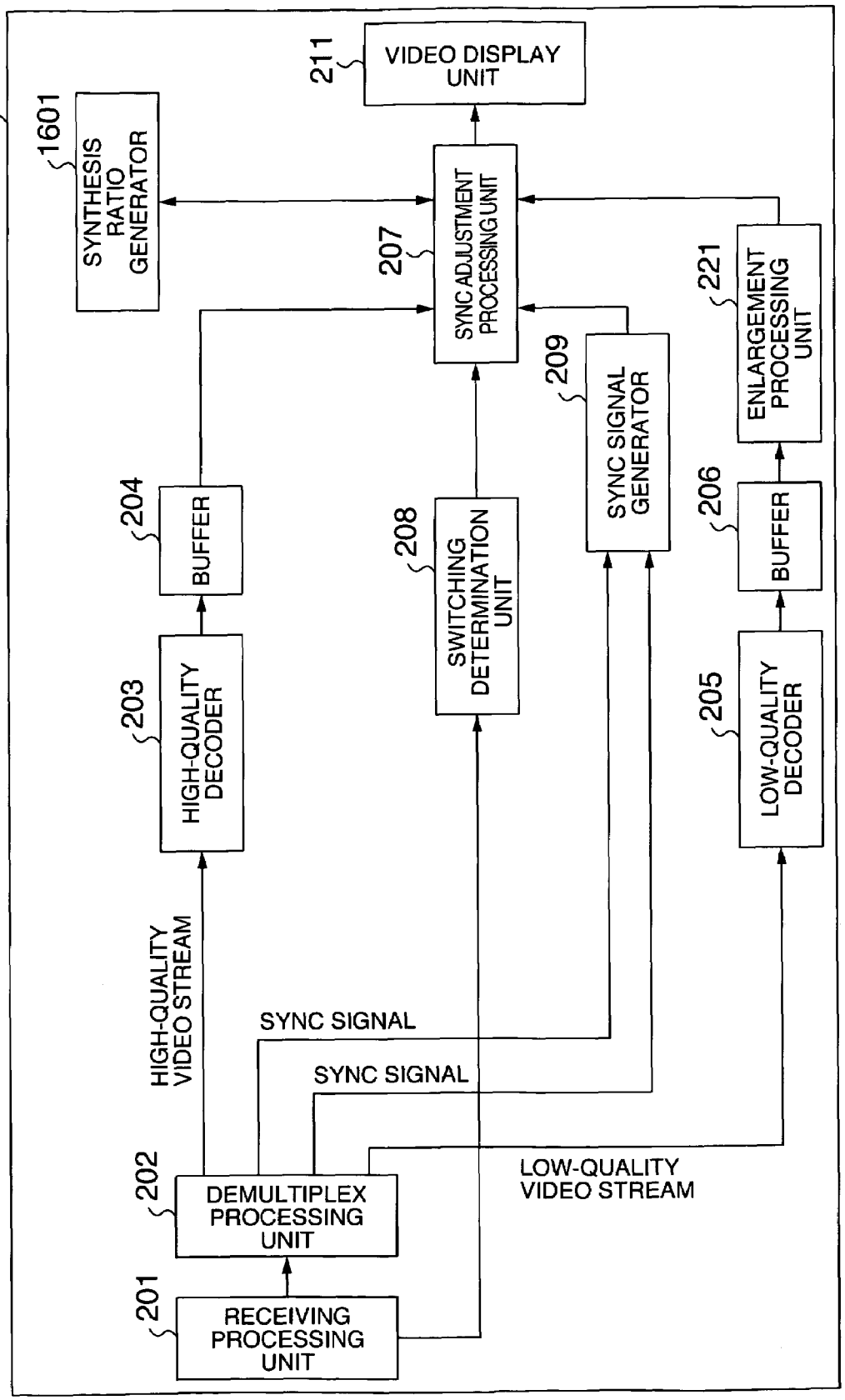
FIG. 4 is a diagram showing a configuration of a digital broadcast receiver according to a second embodiment of the invention.

FIG. 4 is a block diagram showing a configuration of the digital broadcast receiving apparatus according to this embodiment. The configuration of FIG. 4 is characterized by including a synthesis ratio generator 1601 in addition to the configuration of FIG. 1B.

The synthesis ratio generator 1601 has the function of generating an arbitrary synthesis ratio between 0.0 and 1.0 in accordance with the request from the sync adjustment processing unit 207. In the process, the initial value of the synthesis ratio at the scheduled starting time and the final value of the synthesis ratio at the scheduled finish time are designated by the sync adjustment processing unit 207, and in accordance with this designation, the synthesis ratio generator 1601 generates the synthesis ratio between the scheduled starting and the scheduled finish time.

Figure 5:
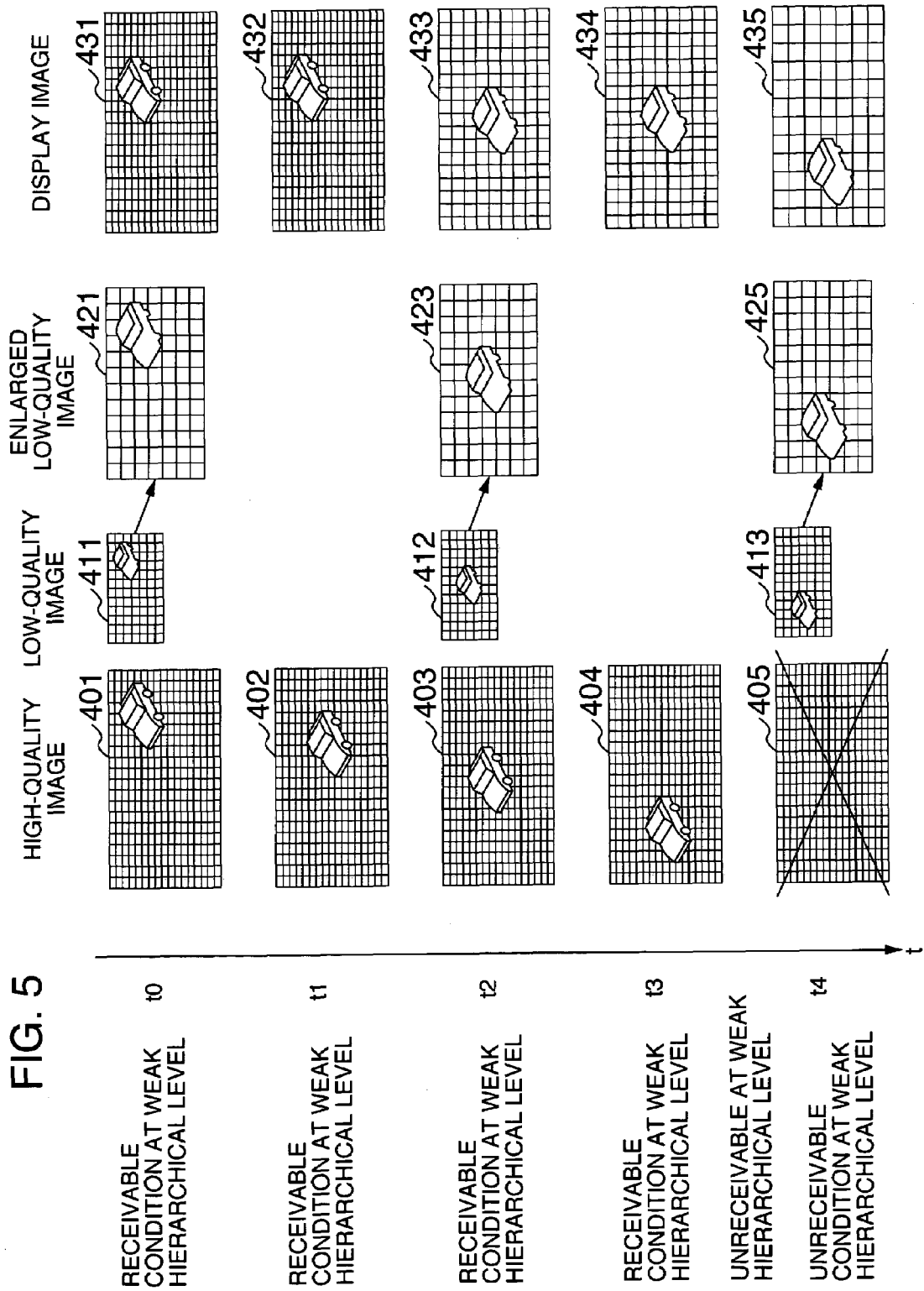
FIG. 5 is a diagram for explaining the video switching operation according to the second embodiment.

FIG. 5 shows an example of image display at the receiving terminal according to the invention. As in FIG. 3, the high-quality images 401 to 405, the low-quality images 411 to 423, the enlarged low-quality images 421, 423, 425 and the display images 431 to 435 corresponding to each time point are shown, top down, from t0 to t4.

The sync adjustment processing unit 207 determines a display image with a delay for a predetermined time. In the case where the current time is t4, the image at time point t0 a predetermined time earlier is displayed.

Upon determination that the image at weak hierarchical level cannot be received during the time between t3 and t4, the sync adjustment processing unit 207 synthesizes the images at a predetermined ratio between the high-quality images 401 to 404 and the enlarged images 421 to 425 of the low-quality images 411 to 413 thereby to generate the display images 431 to 435 during the period from t0 to t3.

Specifically, at time point t0, the high-quality image 401 is set to the ratio 1, and the enlarged image 421 having the same number of pixels as the image 401 as the result of enlargement of the low-quality image 411 at the same time point is set to the ratio 0 thereby to generate the display image 431. In this case, the ratio is 1 to 0, and therefore the image 431 coincides with the image 401.

At time point t1, a corresponding low-quality image is absent, and therefore the image 432 is the same as the image 431. At time point t2, the display image 433 is generated by setting the synthesis ratio between the image 403 and the image 423 at 0.5 to 0.5. At time point t3, like at time point t2, the same image 434 as the image 433 is displayed. At time point t4, unlike at time point t0, the synthesis ratio between the image 405 and the enlarged image 425 is set to 0 to 1 thereby to generate the display image 435. In this case, the display image 435 is the same as the enlarged image 425.

By executing this process, the image resolution can be changed gradually instead of sharply. A plurality of simultaneous broadcast streams, for example, can be switched in accordance with the respective receiving conditions, while switching one stream to another gradually.

In the image frame synthesis according to this embodiment, the image frame enlarged from the low-quality image and the image frame of the high-quality image can be plotted in different planes, and the transmittance of the image displayed in the upper plane can be converted to the synthesis ratio for display.

Third Embodiment

Figure 6:
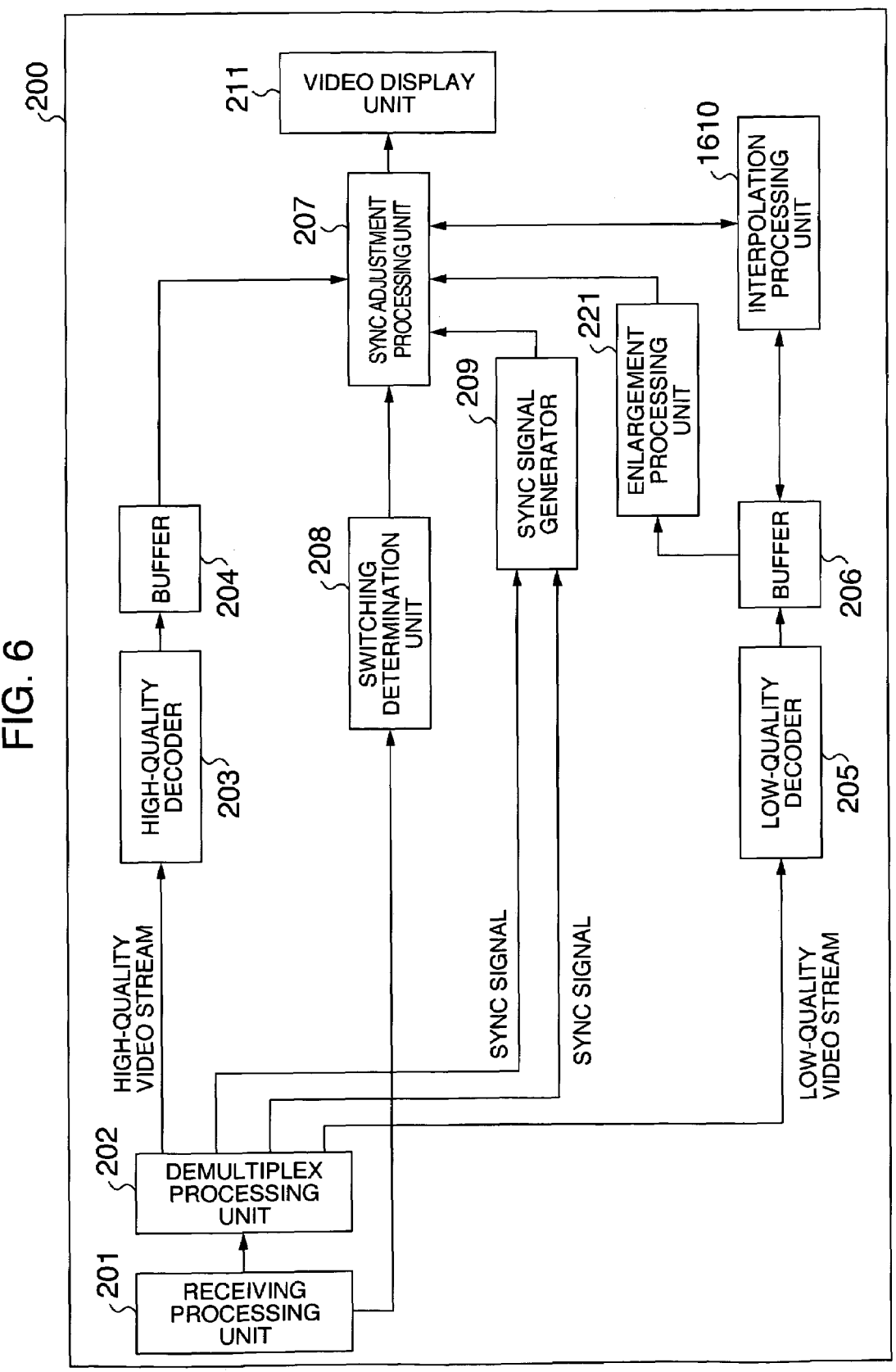
FIG. 6 is a diagram showing a configuration of a digital broadcast receiver according to a third embodiment of the invention.

FIG. 6 is a block diagram showing a configuration of the digital broadcast receiver according to this embodiment. The configuration of FIG. 6 is characterized by including an interpolation processing unit 1610 in addition to the configuration shown in FIG. 4.

The interpolation processing unit 1610 has the function of recovering two successive low-quality images from the buffer 206 in response to an instruction from the sync adjustment unit 207 and generating the interpolated image between the two frames in accordance with the time interval designated by the sync adjustment processing unit 207.

Figure 7:
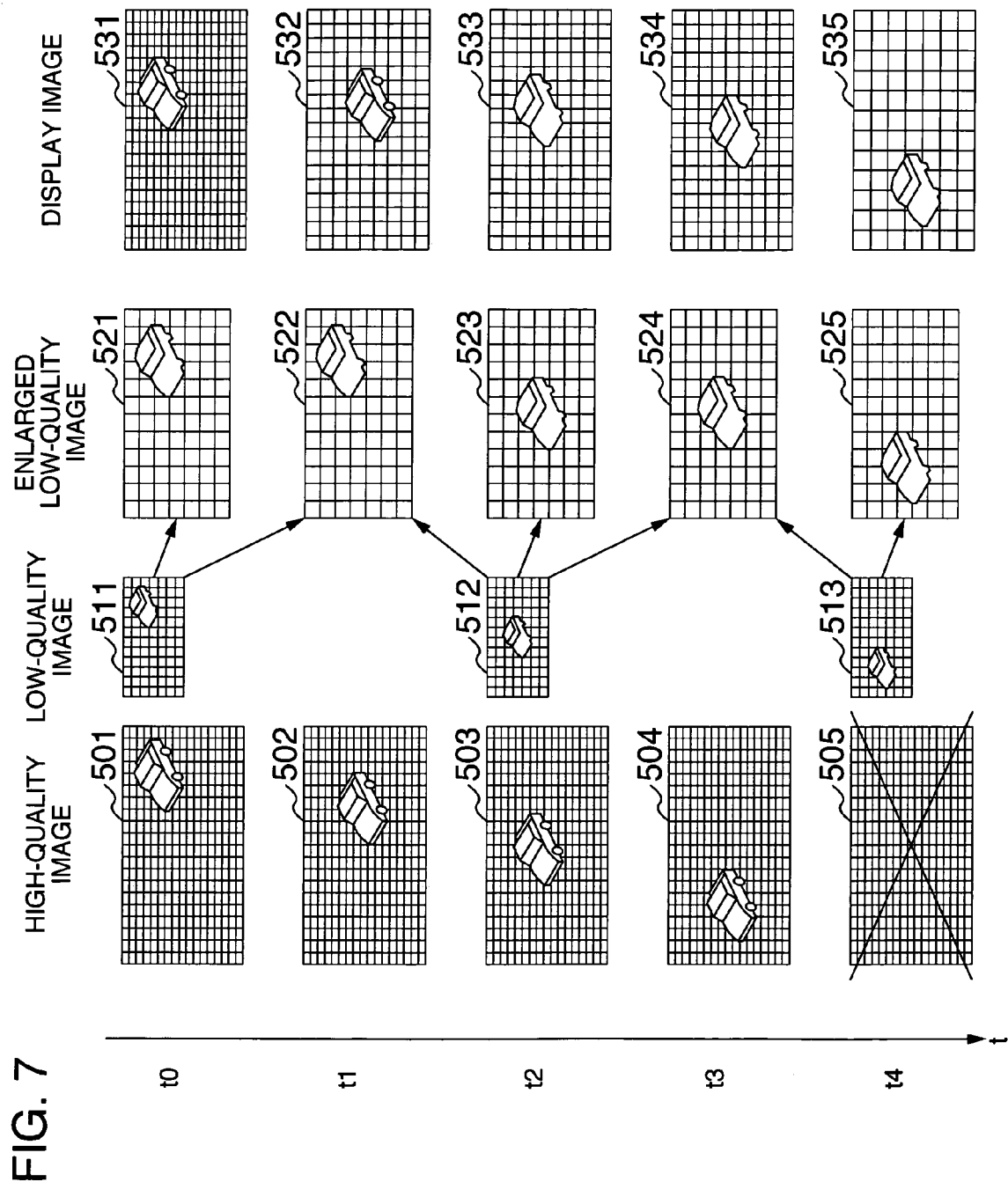
FIG. 7 is a diagram for explaining the video switching operation according to the third embodiment.

FIG. 7 shows an example of an image displayed by the receiving apparatus according to this embodiment. In this embodiment, the frame rate is interpolated to reduce the gap generated at the time of switching.

Like in FIG. 3, the high-quality images 501 to 505, the low-quality images 511 to 513, the enlarged low-quality images 521 to 525 and the display images 531 to 535 corresponding to each time point, top down, are shown from t0 to t4.

The difference from the first embodiment lies in that the sync adjustment processing unit 207 generates an enlarged image at time points t1 and t3 lacking the low-quality image frame from the frames at time points immediately before and after the particular time points. Specifically, the enlarged image 522 of the low-quality image for the frame at time point t1 is generated using the low-quality image 511 at the previous time point t0 and the low-quality image 512 at time point t2. The enlarged image 524 of the low-quality image for the frame at time point t3, on the other hand, is generated using the low-quality image 512 at the previous time point t0 and the low-quality image 513 at time point t2.

In the process, the enlarged image 522 is generated in such a manner that the image is encoded between the low-quality images 511 and 512, and the prediction for the particular period is interpolated by time thereby to produce a synthesized image. This is also the case with the generation of the enlarged image 524.

For example, assume that a video correlation value is acquired between 511 and 512. In accordance with this correlation value, a stationary area between two frames (including an area present in only one of the two frames) and a moving area are detected. In the stationary area, the information is used as it is, while in the moving area, the covered distance and the expansion rate are interpolated at time point t1 for the time length between t0 and t2. Based on this information, the stationary area and the moving area are synthesized thereby to determine the area at time point t1.

Fourth Embodiment

Figure 8:
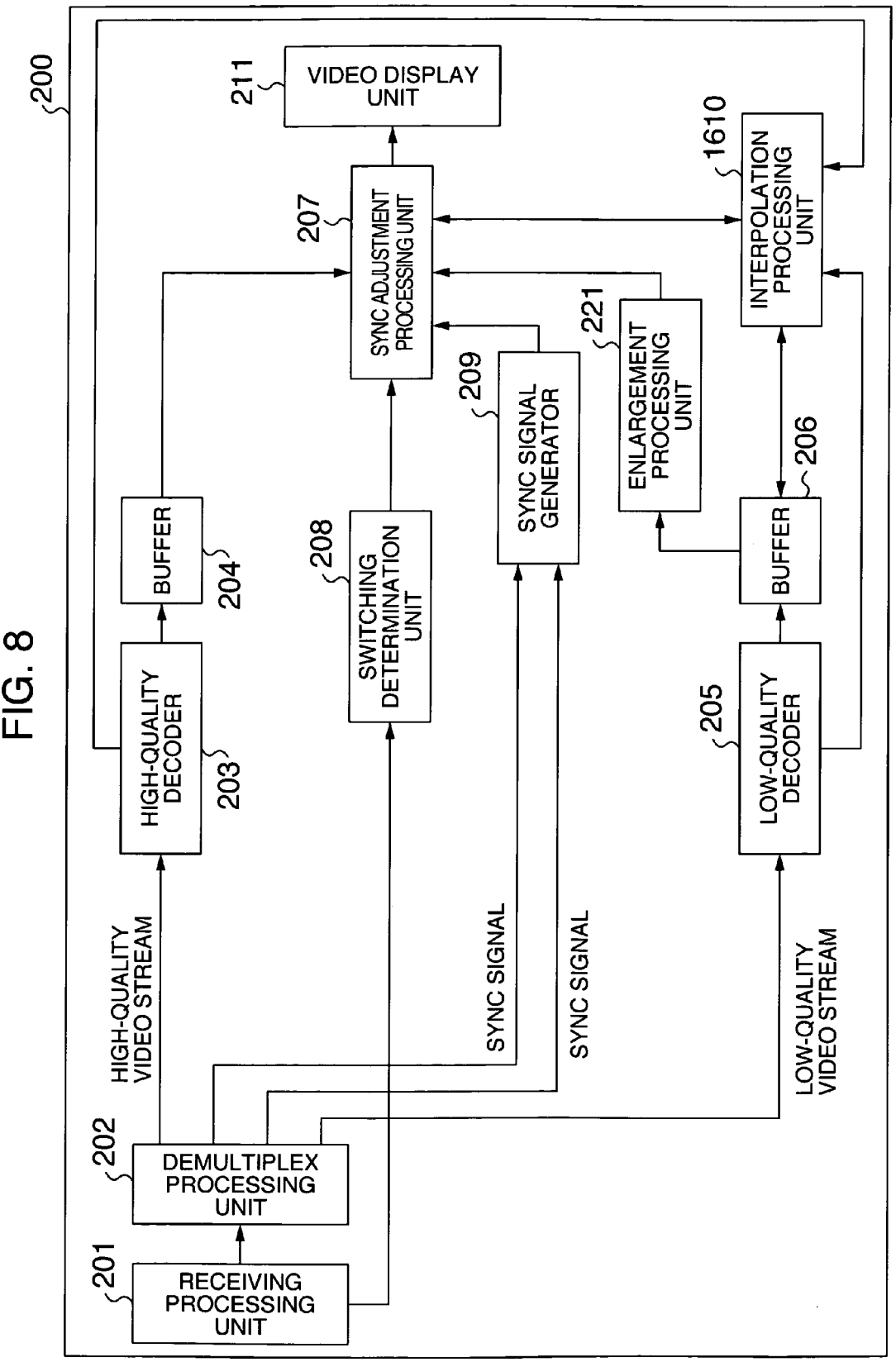
FIG. 8 is a diagram showing a configuration of a digital broadcast receiver according to a fourth embodiment of the invention.

FIG. 8 is a block diagram showing a configuration of a digital broadcast receiving apparatus according to this embodiment. In FIG. 8, the third embodiment (FIG. 6) is so configured that the interpolation processing unit 1610 acquires the decode information (I picture, B picture, P picture) from the high-quality decoder 203 and the low-quality decoder 205.

The interpolation processing unit 1610, in response to an instruction from the sync adjustment processing unit 207, acquires the decode information from the high-quality decoder 203 and the low-quality decoder 205 and executes the process described below.

According to the second and third embodiments, the low-quality image and the high-quality image for the frame at each time point are displayed as they are. The receiving apparatus according to the fourth embodiment, on the other hand, is not necessarily limited to such a case and the image information can be transmitted in compressed form.

Both the high-quality image and the low-quality image used in the receiving apparatus according to this embodiment may be encoded by compression. For example, the MPEG-2 encoding scheme generally used for video compression coding can be used for the high-quality image. Also, the MPEG-4 scheme and the H.264 coding scheme defined under the ISO/IEC standard are applicable to the low-quality image.

In a compression coding scheme for a dynamic image, a still image and the difference information with the still image are often transmitted. Specifically, still images are transmitted at an appropriate interval in the video frame, and only the difference information is sent between the still images thereby to compress the bit rate for transmission.

This still image is called an I picture. The I picture is a frame of an original image compressed without using the information of the other frames and can be restored as a frame independently.

The frame in which only the difference information is transmitted is called the P picture or the B picture according to the difference in characteristic. The P picture is restored by the difference information with the past frame sent previously. The B picture, on the other hand, is restored by the difference information with the future frame as well as with the past frame.

Figure 9:
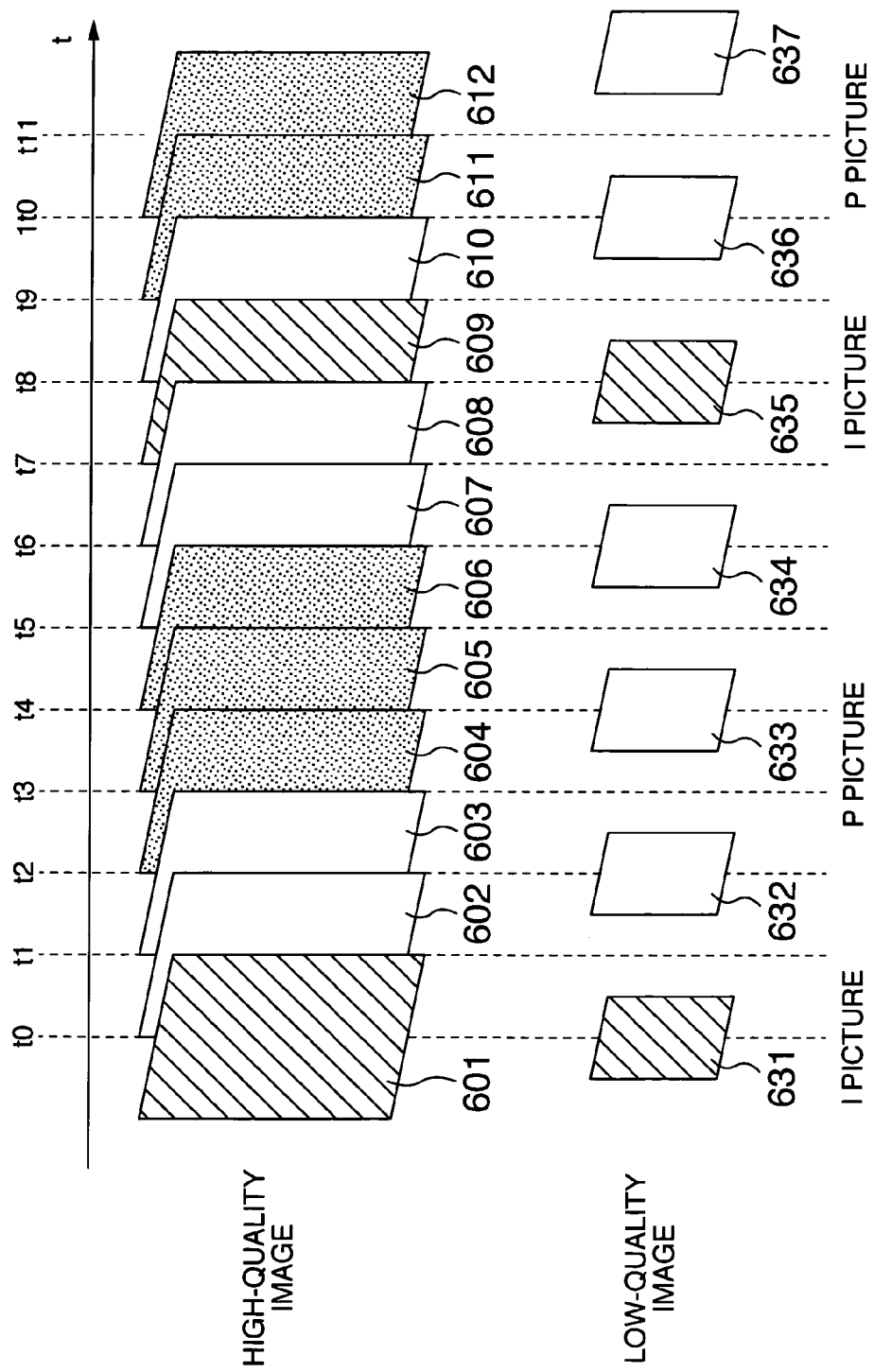
FIG. 9 is a diagram for explaining the video switching scheme according to the fourth embodiment.

FIG. 9 shows an example of each frame train of the low-quality image and the high-quality image. FIG. 9 shows the manner in which time passes from left to right. Numerals 601 to 612 designate the frames of the high-quality image, and numerals 631 to 637 the frames of the low-quality image.

The solid black frames 601, 609, 631, 635 indicate the I picture. The white frames 602, 603, 607, 608, 610, 611, 632, 633, 634, 636, 637 indicate the P picture. The hatched half-tone portions 604, 605, 606, 611, 612 indicate the B picture. In this example, the B picture is not used for the low-quality image.

FIGS. 10A to 10D show the manner of switching from the high-quality image to the low-quality image and from the low-quality image to the high-quality image. In this case, the high-quality image is switched to the low-quality image or the low-quality image to the low high-quality image in the three frames at time points t0, t1, t2.

Figure 10A:
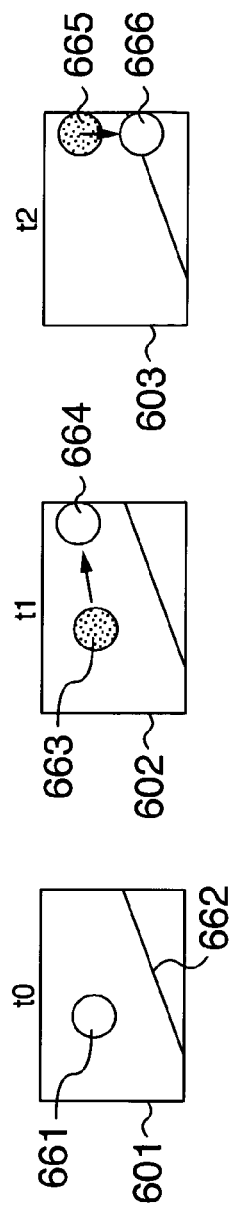
FIGS. 10A to 10D are diagrams for explaining the video switching operation according to the fourth embodiment.

In FIG. 10A, the frame 601 represents a mobile area 661 and a still area 662 at time point t0. The frame 602, as compared with the frame 601, indicates that the mobile area 661 has moved from 663 (661) to 664. The frame 603 indicates, as compared with the frame 602, the movement from the area 665 (664) to 666.

Figure 10B:
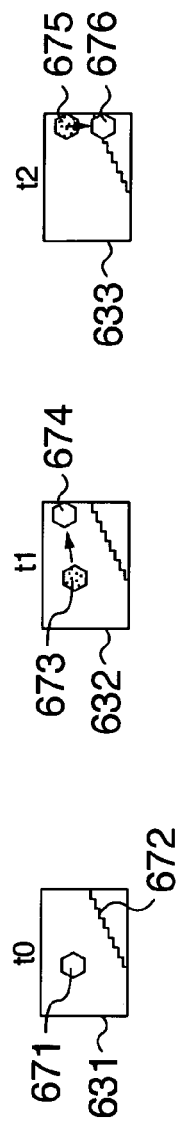

Also in the low-quality image shown in FIG. 10B, numeral 671 of the frame 631 indicates a mobile area and 672 a still area. The frame 632, as compared with the frame 631, indicates the movement from the mobile area 673 (671) to 674. In similar fashion, the frame 633, as compared with the frame 632, indicates the movement from the mobile area 675 (674) to 676.

Figure 10C:
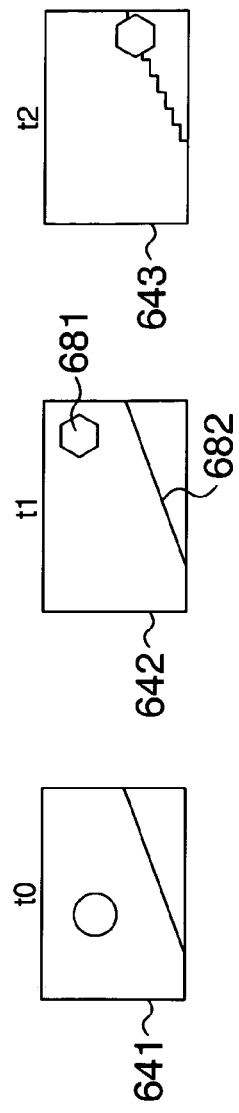

The frames 641 to 643 shown in FIG. 10C are the display images with the high-quality image switched to the low-quality image. This represents a case in which the switching operation is performed in three frames. The frame 641 is the same as the frame 601, and the frame 643 as the frame 633. In the frame 642, the still area 682 is generated using the still area 662 of the frame 601 of the high-quality image, and the mobile area 681 using the mobile area 674 of the low-quality image frame 632.

Figure 10D:
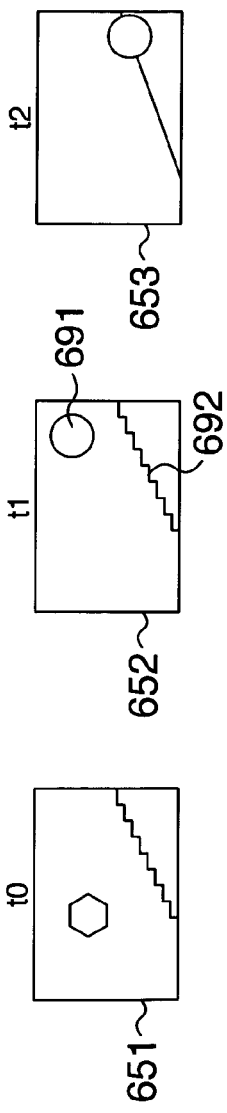

The frames 651 to 653 shown in FIG. 10D are the display images with the low-quality image switched to the high-quality image. Also in this case, the image is switched in three frames. The frame 651 is the same as the frame 631, and the frame 653 the same as the frame 603.

In the frame 652, the still area 692 is generated using the still area 672 of the frame 631 of the low-quality image, and the mobile area 691 is generated using the mobile area 664 of the high-quality image frame 602.

According to this embodiment, the synthesis process can be executed for each mobile area or each still area according to the synthesis ratio of the synthesis ratio generator 1601.

It is also possible to determine the area ratio in the frame of the still area and the mobile area and transfer an object of a small area in priority.

Fifth Embodiment

Figure 11A:
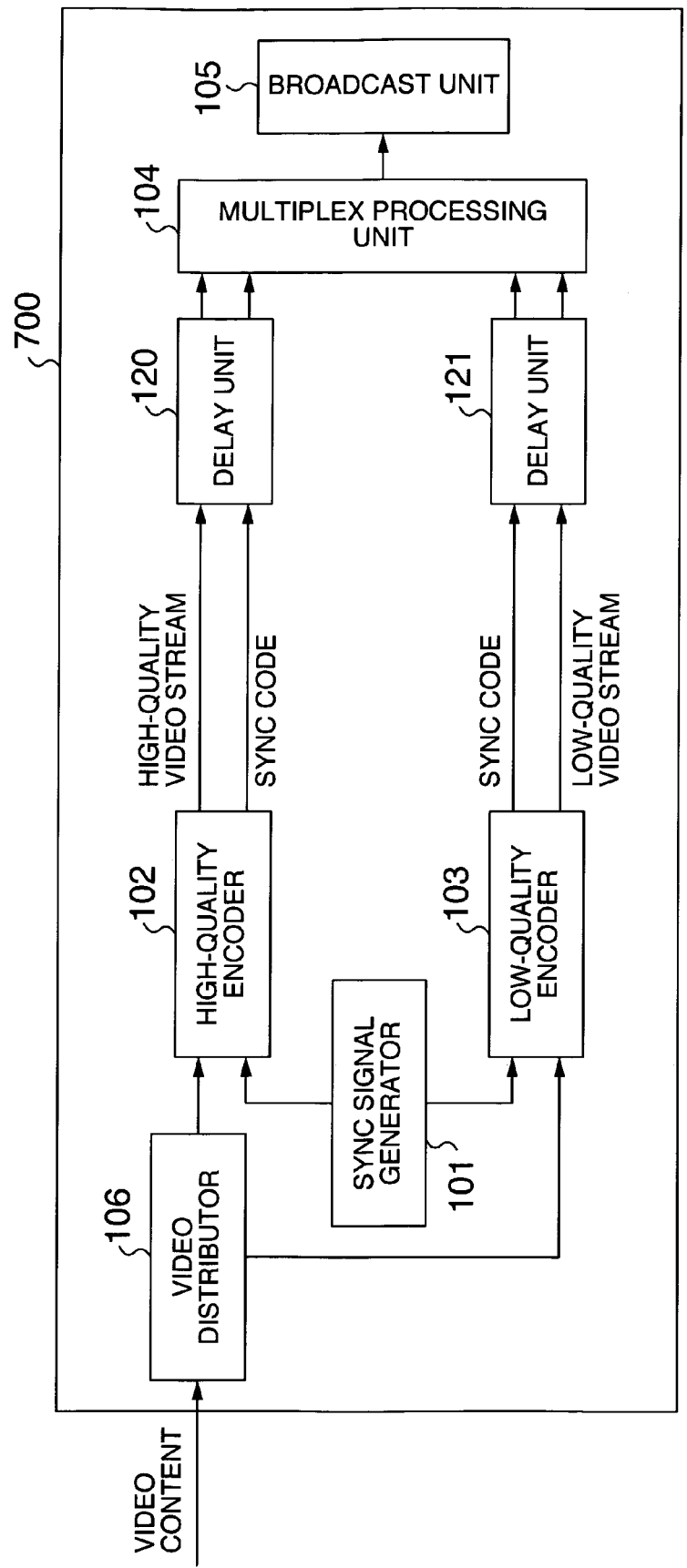
FIGS. 11A, 11B are diagrams showing a configuration of a digital broadcast system according to a fifth embodiment of the invention.
Figure 11B:
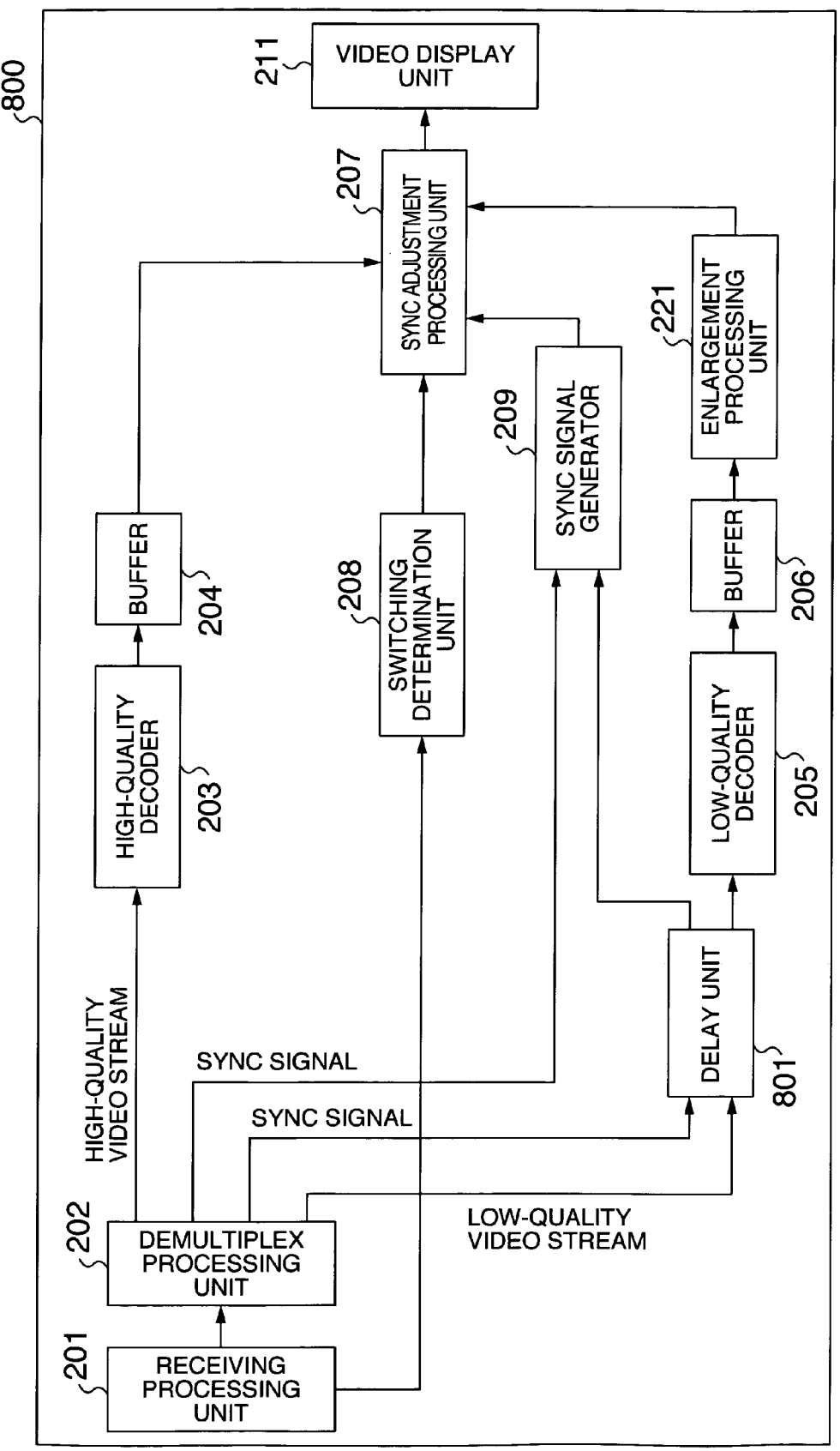

FIGS. 11A, 11B show a configuration of a digital broadcast system according to another embodiment of the invention. FIG. 11A is a block diagram of a sending apparatus, and FIG. 11B a block diagram of a receiving apparatus.

In the sending apparatus 700, unlike in the embodiment shown in FIG. 1A, the delay unit 120 has the function of delaying a great time difference (say, several minutes) as compared with the delay unit 121. As a result, the low-quality video stream can be sent out several minutes earlier than the high-quality video stream.

The broadcast unit 105 broadcasts a signal obtained by multiplexing the video code with the sync signal from the low-quality encoder and the video code with the sync signal from the high-quality encoder delayed a predetermined time behind the former.

The receiving apparatus 800 has a delay unit 801. The receiving apparatus 800 holds in the delay unit 801 the low-quality video code and sync signal received. On the other hand, the high-quality video code is reproduced and displayed by the high-quality sync signal. The sync adjustment processing unit 207 searches the delay unit 801 for the video code having the same time stamp as the sync signal for the high-quality image. In the case where the unreceivable state at weak hierarchical level occurs by the operation of the switching determination unit 208, the video code is decoded by the low-quality decoder 205 from the delay unit 801 and switched to the low-quality image stored in the buffer 206.

With this configuration, the high-quality image and the low-quality image can be transmitted with a great time shift.

Even in the case where a small buffer is insufficient in a tunnel, for example, the image can be viewed by the time-shift reproduction.

Sixth Embodiment

Figure 12B:
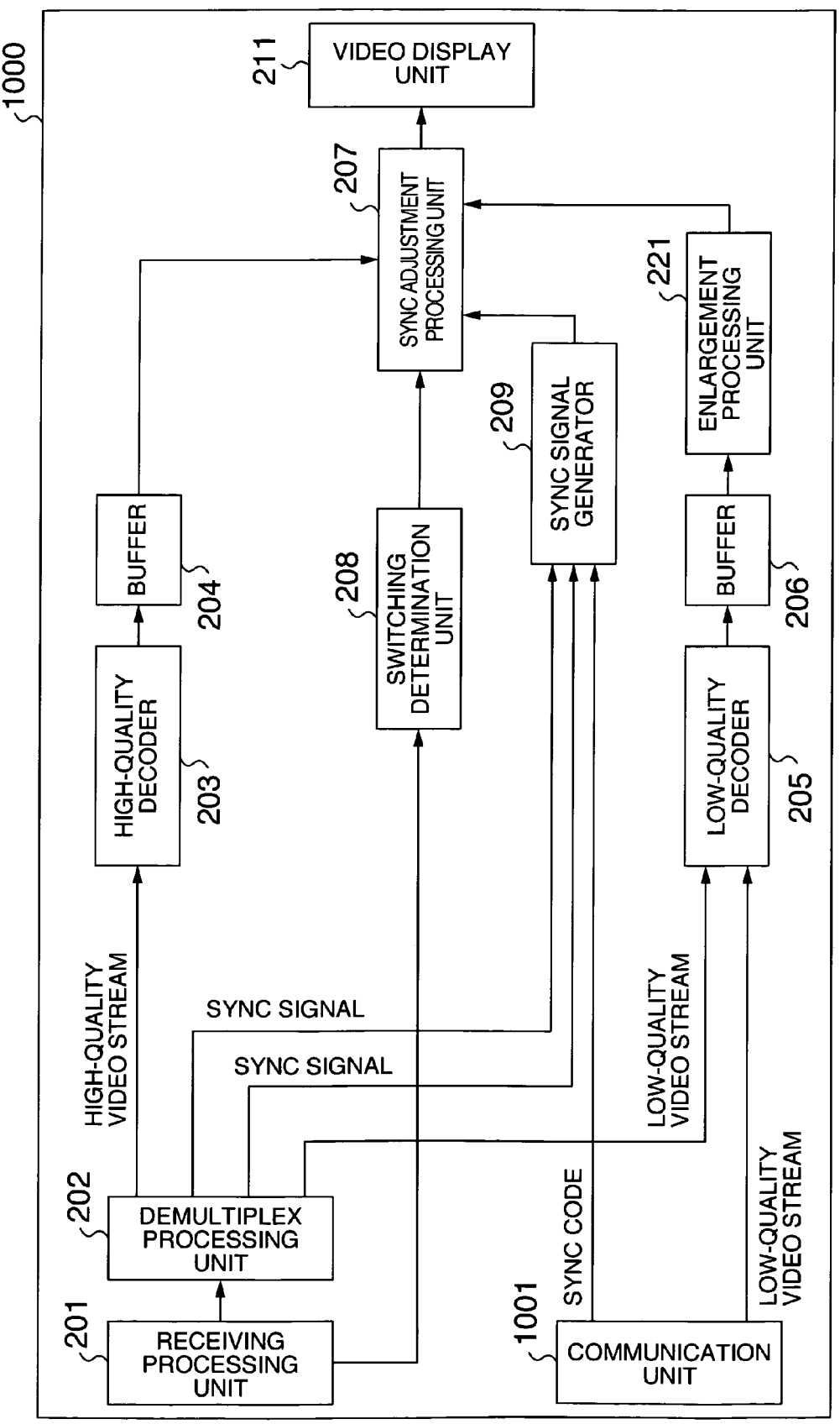

FIGS. 12A, 12B show a digital broadcast system according to still another embodiment of the invention. FIG. 12A is a block diagram of the digital broadcast sending apparatus, and FIG. 12B a block diagram of the digital broadcast receiving apparatus. The sending apparatus 900 and the receiving apparatus 1000 have a communication unit 901 and a communication unit 1001, respectively.

In the communication unit 901, the video code and the sync signal encoded by the low-quality encoder 109 are transmitted to the receiving apparatus 1000 by communication. In the process, the video code may be the same as the signal output to the multiplex processing unit 104. In the case where the communication unit 901 has an insufficient band, however, the coding parameter is changed to change the code bit rate to less than a band of the communication unit 901 that can be transmitted.

The sending apparatus 900 has a delay unit 780 in addition to the delay units 120, 121 of the fifth embodiment (FIG. 11A). The delay unit 780 controls to be a minimum delay time as compared with the delay units 120, 121.

The communication unit 901 conducts communication with the communication unit 1001 of the receiving apparatus 1000 and sends the video code and the sync signal. The switching determination unit 208 of the receiving apparatus 1000 determines whether the receiving is possible at weak and strong hierarchical levels, and in the case where the receiving becomes impossible at both weak and strong hierarchical levels, switches the high-quality image to the low-quality image reproduced based on the video code and the sync signal received from the communication unit 1001.

With this configuration, even in the case where the broadcast radio wave cannot be received at all, the image received through the communication can be reproduced. Also, as shown in the fifth embodiment, the video code and the sync signal received by the communication unit and at each hierarchical level can be sent out or received through an accumulator thereby to make possible the time-shift reproduction.

Seventh Embodiment

Figure 13:
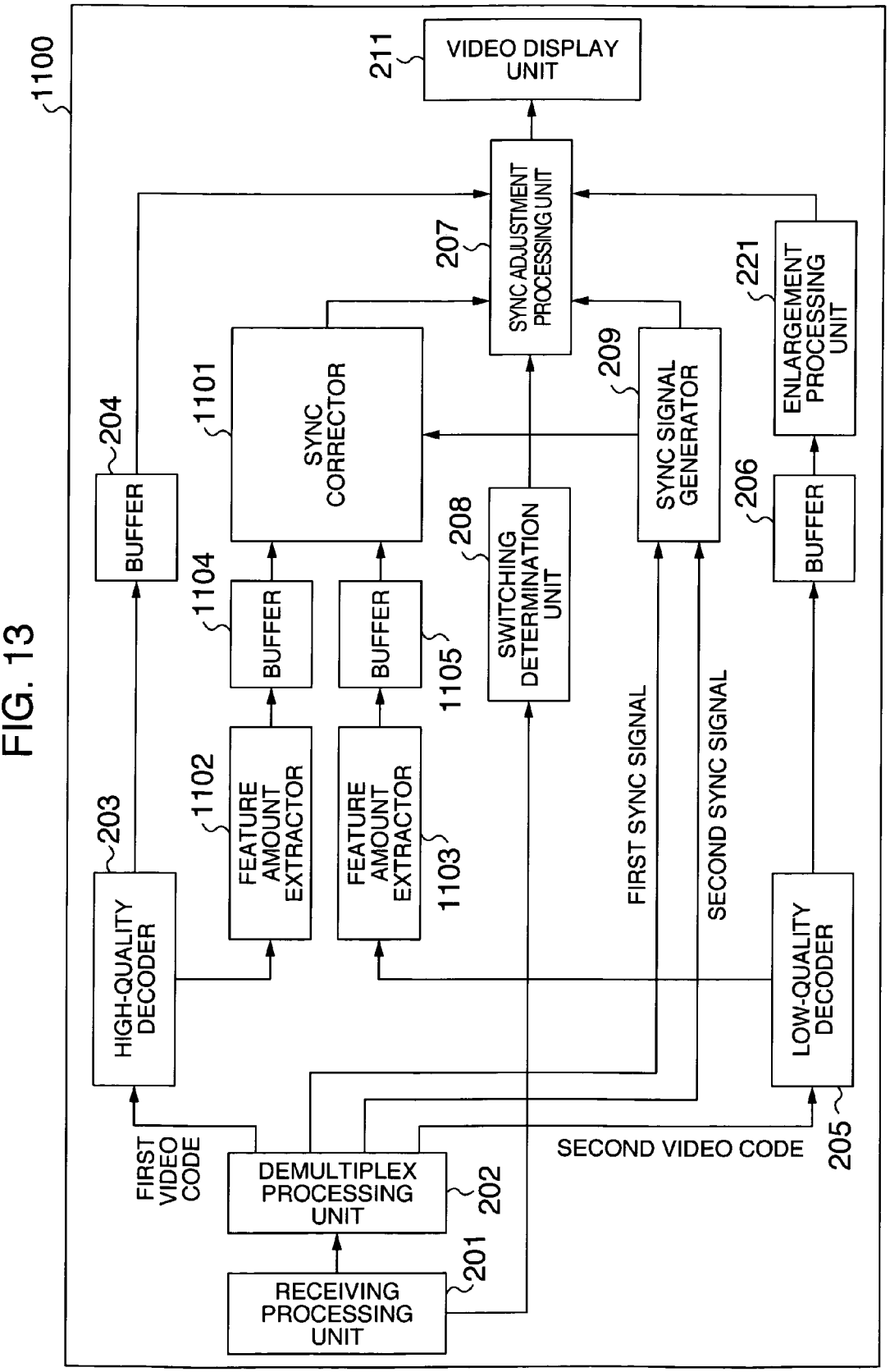
FIG. 13 is a diagram showing a configuration of a digital broadcast receiver according to a seventh embodiment of the invention.

FIG. 13 shows a digital broadcast receiving apparatus according to a further embodiment of the invention. This embodiment includes a sync corrector 1101, and therefore even in the case where the first video signal and the second video signal shift from each other at the transmitting end, the shift can be corrected and the display without any shift is possible at the receiving apparatus end.

The receiving apparatus 1100 includes a feature amount extractor 1102 for extracting the feature amount of a first image from the output of the high-quality decoder 203 and a buffer 1104 for holding the extracted feature amounts in time series. Also, the receiving apparatus 1100 includes a feature amount extractor 1103 for extracting the feature amount of a second image from the output of the low-quality decoder 205 and a buffer 1105 for holding the extracted feature amounts in time series. The sync corrector 1101 detects the time shift amount by comparing the time series data of the feature amounts held in the buffers.

Figure 14:
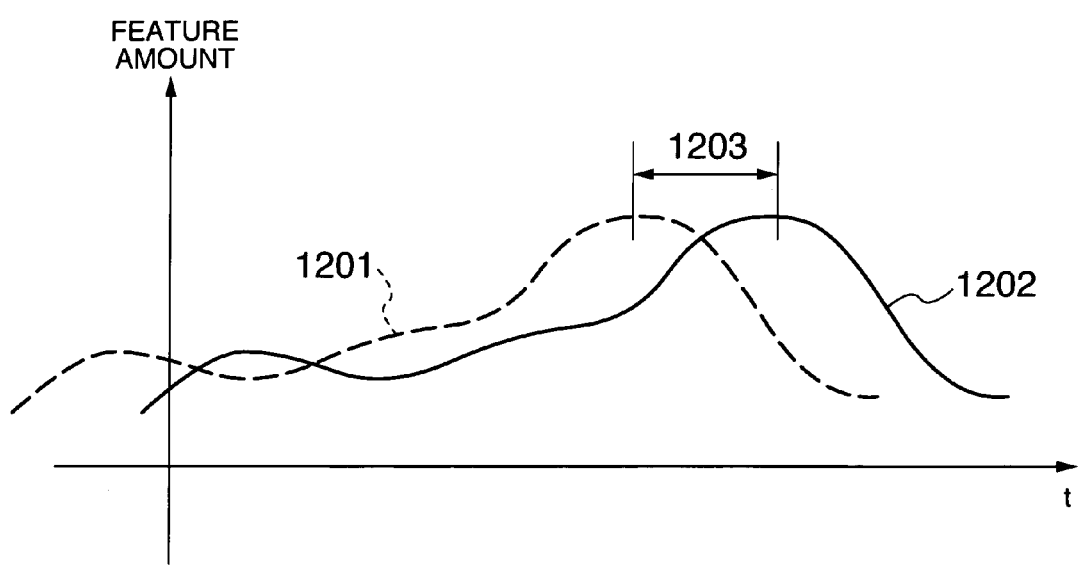
FIG. 14 is a schematic diagram showing the detection of the time shift amount.

FIG. 14 is a schematic diagram showing the detection of a time shift amount. Numeral 1201 is a graph in which the feature amount detected from the first image is plotted in time series. Numeral 1202 is a graph in which the feature amount detected from the second image is plotted in time series. With the time shift amount 1203 as a change parameter, a value for the minimum difference between the two feature amounts is determined as a time shift amount. A method is available in which the least square sum of the difference is determined or in which the correlation coefficient is determined.

In the sync corrector 1101, the sync signal from the sync signal generator 209 for the first and second images is corrected by the detected time shift amount, and the corrected value is supplied to the sync adjustment processing unit 207. Thus, the sync adjustment processing unit 207 executes the process with the corrected sync signal.

For example, the sync signal of the image previously sent is delayed by the time shift amount and supplied to the sync adjustment processing unit 207.

According to this embodiment, the shift between two images can be corrected and displayed by sync adjustment at the receiving end, without strictly synchronizing the two images at the transmitting end.

Each frame image itself can be used as a feature amount. In the case where the MPEG compression scheme is used, no all the frame images but only the I picture image can be used as a feature amount.

Also, as a feature amount, the video scene changes are detected and the time intervals thereof can be used. As an alternative, in the case where the MPEG compression scheme is used, a value of the motion vector normalized by the image size can be used as a feature amount.

In the receiving apparatus according to this embodiment, even in the case where the time shift between a plurality of streams is larger than a predetermined time, the particular shift can be automatically detected and absorbed, thereby making it possible to display images continuously with the switching operation.

Eighth Embodiment

Figure 15:
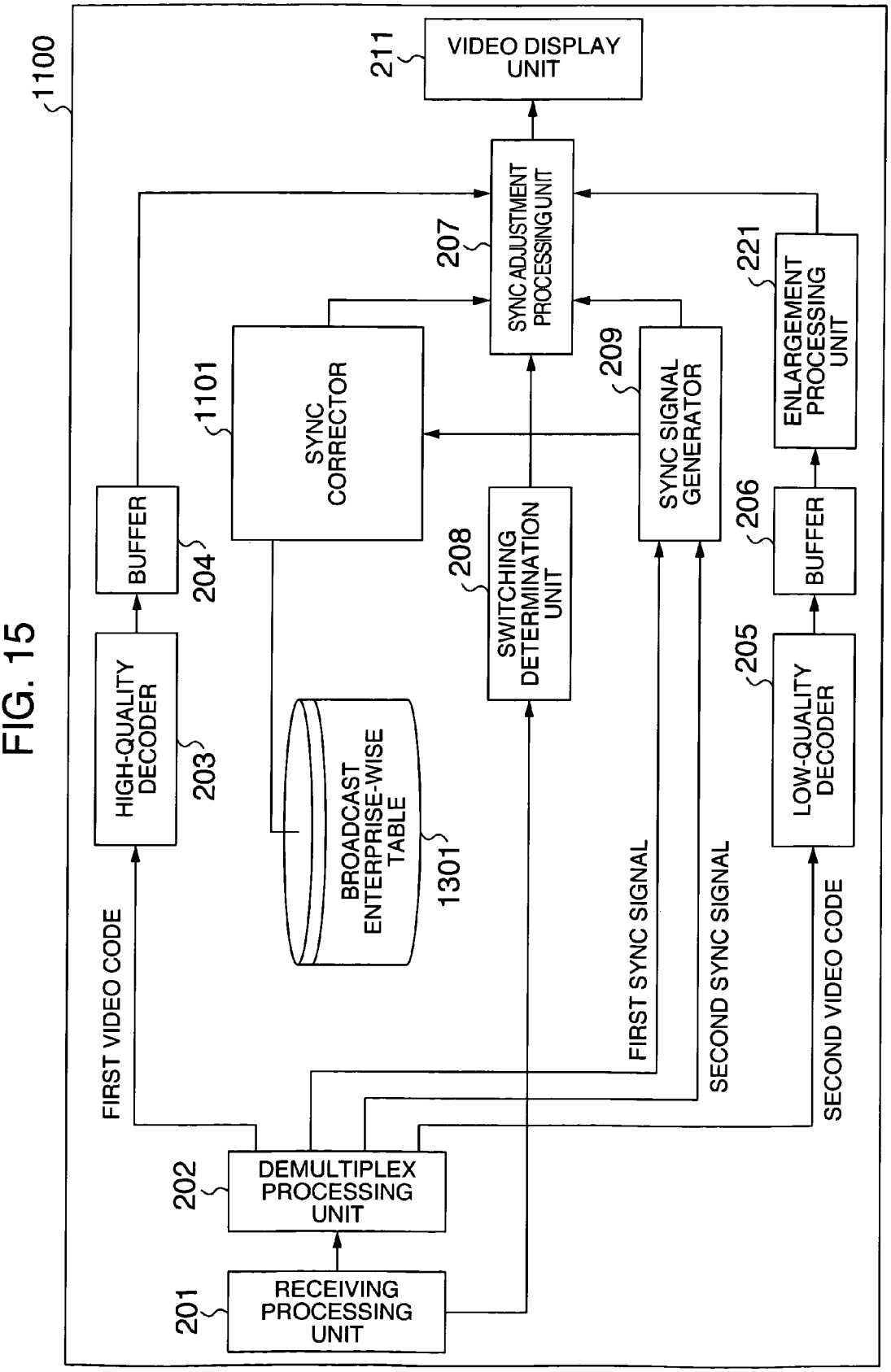
FIG. 15 a diagram showing a configuration of a digital broadcast receiver according to an eighth embodiment of the invention.

FIG. 15 shows a digital broadcast receiving apparatus according a still further embodiment of the invention. According to this embodiment, the sync corrector 1101 has a broadcast enterprise-wise table 1301. The broadcast enterprise-wise table 1301 is a data table for recording the time shift amounts of the first and second images for each broadcast enterprise in advance.

In the sync corrector 1101, in accordance with the receiving channel information, a receiving broadcast enterprise is specified, and the time shift amount corresponding to the particular broadcast enterprise is recovered by searching the broadcast enterprise-wise table 1301. Based on the time shift amount thus acquired, the process shown in the seventh embodiment is executed.

In the case where the time shift amount is substantially constant among the broadcast enterprises, the shift between two images can be corrected and displayed by the sync adjustment at the receiving end without synchronizing the two images strictly at the transmitting end.

Although the embodiments described above deal with the broadcast system having a plurality of hierarchical levels, the high-quality image and the low-quality image may be transmitted at the same hierarchical level. In this case, in spite of the equivalent resistance to the propagation fault for the modulation schemes, the effect equivalent to the frequency diversity is expected. Also, as described in the embodiments of the sending apparatus and the receiving apparatus for the digital broadcast, the invention is applicable also to the terrestrial digital broadcast and the satellite digital broadcast with equal effect. Also, the invention is not dependent on the communication method, and is applicable to the video distribution which may have a plurality of transmission paths in the communication method using any of various radio communications such as mobile phone, PHS or wireless LAN as well as the broadcast.

The embodiments are described above, and this invention is not limited to them, and it is apparent to those skilled in the art that the embodiments can be variously altered or corrected without departing from the spirit of the invention and the scope of claim attached hereto.

The invention claimed is:

1. A digital broadcast receiving apparatus having a video display unit for displaying an image by receiving a multiplexed broadcast signal including a high-quality first video code and a low-quality second video code generated from the same video content and each including a sync signal, comprising:
    a demultiplex processing unit for demultiplexing the data multiplexed on the broadcast signal;
    a first decoder for decoding the high-quality first video code and the sync signal thereof;
    a second decoder for decoding the low-quality second video code and the sync signal thereof;
    a first buffer for holding a high-quality video signal decoded by the first decoder;
    a second buffer for holding a low-quality video signal decoded by the second decoder;
    an enlargement processing unit for recovering and enlarging the low-quality video signal from the second buffer;
    a switching determination unit for monitoring the receiving condition of the high-quality video signal and determining whether the receiving condition is good condition or not; and
    a sync adjustment unit for recovering the high-quality video signal from the first buffer in the case where the determination result of the switching determination unit is good condition, recovering the enlarged low-quality video signal from the enlargement processing unit in the case where the determination result is negative and outputting the recovered video signal to the video display unit in accordance with the delayed one of the sync signals,
    wherein in switching between the high-quality video display and the low-quality video display, the sync adjustment unit switches the high-quality image to the low-quality image or the low-quality image to the high-quality image gradually during a predetermined time,
    wherein the first buffer and the second buffer hold the video frame image for at least the predetermined time, wherein the sync adjustment synthesizes the video frame image held in the first buffer and the video frame image held in the second buffer at a predetermined synthesis ratio, and
    wherein after the time point when the switching determination unit issues a switch instruction before the lapse of the predetermined time, the synthesis ratio is gradually changed for each frame display from the synthesis ratio as of the time point when the switching instruction is issued to the final synthesis ratio.

2. The digital broadcast receiving apparatus according to claim 1, wherein at the time of switching from the display of the high-quality image to the display of the low-quality image, the final synthesis ratio is set to 0 for the high-quality image and 1 for the low-quality image.

3. The digital broadcast receiving apparatus according to claim 1, wherein at the time of switching from the display of the low-quality image to the display of the high-quality image, the final synthesis ratio is set to 0 for the low-quality image and 1 for the high-quality image.

4. The digital broadcast receiving apparatus according to claim 1, wherein the synthesis process is executed in such a manner that in accordance with the number of pixels for the higher resolution, the weighted average is produced in accordance with the synthesis ratio for each pixel.

5. The digital broadcast receiving apparatus according to claim 1,
    wherein the MPEG2 encoding scheme is used for encoding the high-quality image and the MPEG4 encoding scheme for encoding the low-quality image, and
    wherein the synthesis process is executed by adjusting the ratio by macro block.

6. The digital broadcast receiving apparatus according to claim 1,
    wherein the MPEG2 encoding scheme is used for encoding the high-quality image and the MPEG4 encoding scheme for encoding the low-quality image,
    wherein the synthesis process uses the I picture of the MPEG code with the larger setting of the synthesis ratio, and
    wherein in accordance with the synthesis ratio, the P picture or the B picture is decoded using the picture of the other MPEG code.

7. The digital broadcast receiving apparatus according to claim 6, wherein the I picture of MPEG code with the larger setting of the synthesis ratio is used, so that the P picture or the B picture is decoded by executing the synthesis process by macro block in accordance with the synthesis ratio.

8. The digital broadcast receiving apparatus according to claim 1, comprising a receiving accumulator,
    wherein at least the first video code with the sync signal, the second video code with the sync signal and the determination signal indicating the determination information of the switching determination unit are accumulated in the receiving accumulator, and
    wherein in the case of reproduction from the receiving accumulator after receiving, the first video code and the second video code reproduced from the receiving accumulator are switched using the determination signal.

9. A digital broadcast system, comprising:
    a sending apparatus for sending out a broadcast signal by multiplexing a high-quality first video code and a low-quality second video code generated from the same video content, each containing a sync signal, and
    a receiving apparatus for receiving the broadcast signal and displaying an image,
    wherein the receiving apparatus has a video display unit for displaying an image by receiving the multiplexed broadcast signal, and includes
        a demultiplex processing unit for demultiplexing the data multiplexed on the broadcast signal;
        a first decoder for restoring the first video code and the sync signal thereof;
        a second decoder for restoring the second video code and the sync signal thereof;
        a first buffer for holding the decoded high-quality video signal;
        a second buffer for holding the decoded low-quality video signal;
        an enlargement processing unit for recovering and enlarging the low-quality video signal from the second buffer;
        a switching determination unit for monitoring the receiving condition of the high-quality video signal and determining whether the receiving condition is good condition or not; and a sync adjustment unit for recovering the high-quality video signal from the first buffer in the case where the determination result of the switching determination unit is good condition, recovering the enlarged low-quality video signal from the enlargement processing unit in the case where the determination result is negative and outputting the video signal to the video display unit in accordance with the delayed one of the sync signals;

wherein in switching between the high-quality video display and the low-quality video display, the sync adjustment unit switches the high-quality image to the low-quality image or the low-quality image to the high-quality image gradually during a predetermined time, wherein the first buffer and the second buffer hold the video frame image for at least the predetermined time, wherein the sync adjustment synthesizes the video frame image held in the first buffer and the video frame image held in the second buffer at a predetermined synthesis ratio, and wherein after the time point when the switching determination unit issues a switch instruction before the lapse of the predetermined time, the synthesis ratio is gradually changed for each frame display from the synthesis ratio as of the time point when the switching instruction is issued to the final synthesis ratio wherein the sending apparatus includes a sync signal generator for generating the sync signal;

a video distributor for distributing the video content;

a first video encoder for encoding one of the distributed video content in synchronism with the sync signal and generating the first video code and a sync code in synchronism with the first video code;

a second video encoder for encoding another one of the distributed video content in synchronism with the sync signal with a different quality than the first video encoder and generating the second video code and a sync code in synchronism with the video code;

a first delay unit for delaying the first video code and the first sync code;

a second delay unit for delaying the second video code and the second sync code; and a multiplexer for multiplexing the first video code including the first sync code thereof and the second video code including the second sync code thereof with a time shift of not longer than a predetermined time.

10. The digital broadcast system according to claim 9,
wherein the sending apparatus includes a sending accumulator for accumulating the first video code and the sync signal, and the sending accumulator outputs the first video code and the sync signal delayed by a predetermined time to the multiplexer, and wherein the receiving apparatus includes a receiving accumulator for accumulating the second video code and the sync signal, and the code and the signal accumulated in the receiving accumulator are used as the second video code and the sync signal thereof, respectively.

11. The digital broadcast system according to claim 9,
wherein the sending apparatus includes a sending communication unit and transmits a third video code and the sync signal through the sending communication unit, wherein the receiving apparatus includes a receiving communication unit and transmits the third video code and the sync signal through the receiving communication unit, and wherein in the case where the first video code becomes unreceivable upon determination of the switching determination unit, the first video code is switched to the second video code or the third video code.

12. A digital broadcast receiving apparatus, comprising:

a receiving processing unit for receiving a multiplexed broadcast signal including a high-quality first video code and a low-quality second video code generated from the same video content and each including a sync signal;

a demultiplex processing unit for demultiplexing the data multiplexed on the broadcast signal;

a first decoder for decoding the first video code and the first sync signal and detecting a first image from the decoded first video code;

a second decoder for decoding the second video code and the second sync signal and detecting a second image from the decoded second video code;

a first buffer for storing the detected first image;

a second buffer for storing the detected second image;

a first feature amount extractor for extracting a feature amount of the first image, based on a predetermined feature amount with regard to the detected first image detected by the first decoder;

a second feature amount extractor for extracting a feature amount of the second image, based on a predetermined feature amount with regard to the detected second image detected by the second decoder;

a switching determination unit for monitoring a receiving condition of the receiving processing unit and determining the display or non-display of the first image based on a receiving condition of a broadcast signal of the first image or a bit error rate of the received first video code or a decoding condition of the first image at a time when the broadcast signal of the first image is received;

a sync signal generator for outputting a sync signal based on a sync signal of the broadcast signal of the received broadcast signal;

a video display unit for displaying the decoded first image or the second image;

a sync corrector for detecting a time shift amount between a feature amount extracted by the first feature amount extractor and a feature amount extracted by the second feature amount extractor and delaying the earlier one of the sync signal for the first image and the sync signal for the second image by an amount equal to the time shift amount to correct the sync signal output by the sync signal generator;

an enlargement processing unit for enlarging the second image: and a sync adjustment processing unit for switching between the first image and the second image enlarged by the enlargement processing unit based on the determination result of the switching determination unit and the sync signal corrected by the sync signal corrector.

13. The digital broadcast receiving apparatus according to claim 12,
wherein the sync corrector includes a first feature extractor for extracting the feature amount of the first image, a third buffer for holding the first feature data constituting the time series data of the feature amount, a second feature extractor for extracting the feature amount of the second image and a fourth buffer for holding the second feature data constituting the time series data of the feature amount, and wherein by analyzing the temporal correlation between the first feature data and the second feature data, the time shift amount of the sync signal is detected by the sync corrector.

14. The digital broadcast receiving apparatus according to claim 13, wherein a decoded image is used as the feature data.

15. The digital broadcast receiving apparatus according to claim 13, wherein the I picture image is used as the video feature amount.

16. The digital broadcast receiving apparatus according to claim 13, wherein the video switching information is used as the video feature amount.

17. The digital broadcast receiving apparatus according to claim 13, wherein the normalized motion vector value is used as the video feature amount.

18. The digital broadcast receiving apparatus according to claim 12,
wherein the sync corrector holds a table for correcting the shift between the first sync signal and the second sync signal, and the shift of the sync signals is corrected by the information of the table, wherein the table stores a time shift amount for each of a plurality of broadcast entities that transmit multiplexed broadcast signals.

* * * * *